US012541197B2

(12) United States Patent
Nield et al.

(10) Patent No.: US 12,541,197 B2
(45) Date of Patent: *Feb. 3, 2026

(54) CONTROLLING SIMULATED AND PHYSICAL VEHICLES WITH HANDHELD DEVICES

(71) Applicant: Yawman LLC, Carmel, IN (US)

(72) Inventors: Thomas Michael Nield, Frisco, TX (US); Matthew Charles Perez, Blacksburg, VA (US); Paul Cilino, Atlanta, GA (US)

(73) Assignee: Yawman LLC, Carmel, IN (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/514,789

(22) Filed: Nov. 20, 2023

(65) Prior Publication Data
US 2024/0085902 A1 Mar. 14, 2024

Related U.S. Application Data

(63) Continuation-in-part of application No. 17/383,728, filed on Jul. 23, 2021, now Pat. No. 11,868,125.

(51) Int. Cl.
G05D 1/00 (2024.01)
B64U 20/00 (2023.01)

(52) U.S. Cl.
CPC ........... *G05D 1/0022* (2013.01); *B64U 20/00* (2023.01); *B64U 2201/20* (2023.01)

(58) Field of Classification Search
CPC .... G05D 1/0022; G05D 1/0016; B64U 20/00; B64U 2201/20; B64U 2101/30; B64C 39/024; B64C 13/04
See application file for complete search history.

(56) References Cited

U.S. PATENT DOCUMENTS

D360,436 S 7/1995 Chan
D401,974 S 12/1998 Oikawa
(Continued)

FOREIGN PATENT DOCUMENTS

KR 101392265 5/2014

OTHER PUBLICATIONS

USPTO, Notice of Allowance issued in U.S. Appl. No. 17/383,728 on Aug. 16, 2023, 25 pages.
(Continued)

Primary Examiner — Curtis J King
(74) Attorney, Agent, or Firm — Henry Patent Law Firm PLLC

(57) ABSTRACT

In a general aspect, a handheld controller device includes a housing and a trigger assembly. The housing is configured to be held in the hands of a user. The trigger assembly includes a pair of triggers extending outward from a side of the handheld controller device and configured to move along respective trigger paths. The trigger assembly also includes a guide and coupling assemblies. The guide assembly is disposed inside the housing and includes, for each trigger, a channel that extends at least partially along the trigger path of the trigger. The coupling assembly is disposed inside the housing and is connected to the pair of triggers. The coupling assembly is configured to transfer motion between the pair of triggers such that, when one trigger moves towards the housing along its respective trigger path, the coupling assembly moves the other trigger away from the housing along its trigger path.

30 Claims, 18 Drawing Sheets

(56) References Cited

U.S. PATENT DOCUMENTS

| | | | |
|---|---|---|---|
| 5,874,906 A * | 2/1999 | Willner | G06F 3/0219 |
| | | | 348/E5.103 |
| D408,394 S | 4/1999 | Chin et al. | |
| 6,128,006 A | 10/2000 | Rosenberg et al. | |
| D453,932 S | 2/2002 | Han et al. | |
| 6,740,830 B2 | 5/2004 | Sato et al. | |
| D504,430 S | 4/2005 | Takahashi et al. | |
| 6,893,320 B2 | 5/2005 | Caiozza | |
| 7,094,153 B2 * | 8/2006 | Kunieda | A63F 13/5255 |
| | | | 463/32 |
| D546,904 S | 7/2007 | Bowen et al. | |
| D573,204 S | 7/2008 | Arai et al. | |
| 7,471,216 B2 * | 12/2008 | Chen | A63F 13/245 |
| | | | 341/20 |
| D585,931 S | 2/2009 | Palmer | |
| 7,731,588 B2 * | 6/2010 | Templeman | A63F 13/00 |
| | | | 446/454 |
| 7,843,431 B2 * | 11/2010 | Robbins | G05D 1/0038 |
| | | | 345/161 |
| D638,016 S | 5/2011 | Ikeda | |
| 8,154,953 B1 | 4/2012 | Sims et al. | |
| D670,768 S | 11/2012 | Isono et al. | |
| D672,397 S | 12/2012 | Wai | |
| D685,434 S | 7/2013 | Ali et al. | |
| D700,182 S | 2/2014 | Kidakarn | |
| 8,676,406 B2 * | 3/2014 | Coffman | G05D 1/0016 |
| | | | 701/3 |
| D707,758 S | 6/2014 | Norman et al. | |
| D708,615 S | 7/2014 | Moreau et al. | |
| D712,982 S | 9/2014 | Barajas et al. | |
| 8,932,135 B2 | 1/2015 | Coe | |
| D735,721 S | 8/2015 | Mar | |
| D740,708 S | 10/2015 | Pecorari | |
| D749,527 S * | 2/2016 | Li | D14/218 |
| 9,522,726 B1 | 12/2016 | Bowers | |
| 9,533,219 B2 | 1/2017 | Burgess et al. | |
| D780,269 S * | 2/2017 | Isono | D21/566 |
| D806,078 S | 12/2017 | Goldman et al. | |
| 10,159,896 B2 | 12/2018 | Strahle et al. | |
| 10,201,747 B2 | 2/2019 | Mistry | |
| 10,226,697 B2 | 3/2019 | Schmitz et al. | |
| 10,232,254 B2 | 3/2019 | Gassoway et al. | |
| D844,716 S | 4/2019 | Gan | |
| D849,146 S | 5/2019 | Mar et al. | |
| D856,334 S | 8/2019 | Salter | |
| 10,427,035 B2 | 10/2019 | Schmitz et al. | |
| D870,825 S | 12/2019 | Wang et al. | |
| D872,185 S | 1/2020 | Chatterjee et al. | |
| D885,497 S | 5/2020 | Miller | |
| D892,115 S | 8/2020 | Gan | |
| D898,124 S | 10/2020 | Tong | |
| 10,843,069 B2 * | 11/2020 | Ironmonger | G06F 3/0202 |
| 10,994,197 B2 | 5/2021 | Schmitz | |
| 11,000,762 B2 * | 5/2021 | Hollingsworth | A63F 13/214 |
| 11,070,735 B2 * | 7/2021 | Koyama | G03B 13/32 |
| 11,079,752 B1 * | 8/2021 | Lombardini | B64U 10/14 |
| 11,103,775 B2 * | 8/2021 | Ironmonger | A63F 13/428 |
| D981,412 S | 3/2023 | Wu | |
| D992,645 S | 7/2023 | Nield | |
| 11,868,125 B2 | 1/2024 | Nield | |
| D1,047,002 S | 10/2024 | Lianyong | |
| D1,060,529 S | 2/2025 | Chen | |
| 2005/0119051 A1 | 6/2005 | Ko | |
| 2006/0054482 A1 * | 3/2006 | Radu | H01H 9/182 |
| | | | 200/308 |
| 2006/0116204 A1 * | 6/2006 | Chen | A63H 30/04 |
| | | | 463/37 |
| 2011/0035079 A1 * | 2/2011 | Allen | G05D 1/0016 |
| | | | 701/2 |
| 2014/0111317 A1 | 4/2014 | Shen | |
| 2015/0202540 A1 | 7/2015 | Erhart et al. | |
| 2015/0370256 A1 | 12/2015 | Erhart et al. | |
| 2017/0036771 A1 | 2/2017 | Woodman et al. | |
| 2017/0309088 A1 | 10/2017 | Arya et al. | |
| 2017/0349277 A1 | 12/2017 | Erhart et al. | |
| 2018/0076648 A1 * | 3/2018 | Kumar | A63F 13/98 |
| 2018/0081351 A1 * | 3/2018 | Tankersley | G05D 1/652 |
| 2018/0095492 A1 | 4/2018 | Matloff | |
| 2018/0104574 A1 | 4/2018 | Tager | |
| 2018/0214771 A1 * | 8/2018 | Tran | A63F 9/0001 |
| 2018/0214779 A1 * | 8/2018 | Tran | A63F 13/25 |
| 2020/0079507 A1 * | 3/2020 | Deng | G08G 5/57 |
| 2020/0250903 A1 | 8/2020 | Arya et al. | |
| 2020/0272144 A1 | 8/2020 | Yang et al. | |
| 2020/0391878 A1 | 12/2020 | Woodman et al. | |
| 2021/0060418 A1 | 3/2021 | Kawashima et al. | |
| 2021/0173391 A1 | 6/2021 | Parazynski et al. | |
| 2021/0197080 A1 | 7/2021 | Su | |
| 2022/0326705 A1 * | 10/2022 | Thompson | B64C 39/024 |
| 2022/0370894 A1 * | 11/2022 | Fahmie | A63F 13/22 |
| 2023/0025582 A1 | 1/2023 | Nield | |
| 2023/0261359 A1 * | 8/2023 | Lebovitz | H04M 1/72409 |
| | | | 343/720 |
| 2024/0416226 A1 * | 12/2024 | Fahmie | A63F 13/22 |

OTHER PUBLICATIONS

Fselite, Yawman Arrow; retrieved from Internet Feb. 14, 2023; https://fselite.net/content/first-look-yawman-arrow/, Jan. 17, 2023, 1 pg.

Yawman Flight, Yawman Arrow; retrieved from Internet Feb. 14, 2023; https://yawmanflight.com/blogs/news/introducting-the-yawman-arrow, Jan. 17, 2023, 1 pg.

BETAFPV, Literadio 2SE Transmitter, retrieved from Internet on Feb. 14, 2023; https://www.amazon.com/BETAFPV-Literadio-Transmitter-Throttle-Controller/dp/B08PV3QRTG/ref=cm_cr_arp_d_product_top?ie=UTF8, Mar. 9, 2021, 1 pg.

"FrSky", Taranis X-Lite Pro, retrieved from Internet on Feb. 14, 2023; https://www.amazon.com/FrSky-Installed-Protocol-Wireless-Tranining/dp/B07QJ38Q1X/ref=cm_cr_arp_d_product_top?ie=UTF8, Dec. 4, 2019, 1 pg.

"Looking for advice on improvements for HOTAS/gamepad.", Reddit; downloaded May 5, 2021, from https://www.reddit.com/r/HotasDIY/comments/n1ql33/looking_for_advice_on_improvements_for/, 11 pgs.

USPTO, Ex Parte Quayle Action issued in U.S. Appl. No. 29/877,029 on Mar. 10, 2025, 28 pages.

Yawman, Arrow Controller, published on Feb. 3, 2024 [online]. Retrieved from internet (Date: Feb. 28, 2025), https://www.sportys.com/yawman-arrow-controller.html#reviews (Year: 2024), Feb. 3, 2024, 1 page.

Tuuvas, Yawman Arrow Review, published on Jan. 18, 2024 [online]. Retrieved from internet (Date: Feb. 28, 2025), https://www.youtube.com/watch?v=JhYy61tZ-U (Year: 2024), Jan. 18, 2024, 1 page.

Yawman, Arrow Handheld Controller, published on Jan. 29, 2024 [online]. Retrieved from internet (Date: Feb. 28, 2025), https://web.archive.org/web/20240129074128/https://yawmanflight.com/products/yawman-arrow-handheld-controller (Year: 2024), Jan. 29, 2024, 1 page.

FSElite, Yawman Arrow, published on Jan. 5, 2024 [online]. Retrieved from internet (Date: Feb. 28, 2025), https://www.youtube.com/watch?v=sTdXIwGbgXg (Year: 2024), Jan. 5, 2024, 1 page.

Aerosoft, Yawman Arrow, published on May 18, 2024 [online]. Retrieved from internet (Date: Feb. 28, 2025), https://web.archive.org/web/20240518092207/https://www.aerosoft.com/it/negozio/flight/hardware/strumentazione/4290/yawman-arrow (Year: 2024), May 18, 2024, 1 page.

Isa, International Search Report and Written Opinion issued in Application No. PCT/US2024/018101 on Jun. 17, 2024, 19 pages.

USPTO, Non-Final Office Action issue in U.S. Appl. No. 18/478,812 on Jul. 21, 2025, 26 pages.

* cited by examiner

CONTROLLING SIMULATED AND PHYSICAL VEHICLES WITH HANDHELD DEVICES

This application is a continuation-in-part of U.S. application Ser. No. 17/383,728, filed Jul. 23, 2021, entitled "Controlling Simulated and Remotely Controlled Flyable Aircraft with Handheld Devices," which is hereby incorporated by reference.

BACKGROUND

Background

The following description relates to controlling simulated and physical vehicles with handheld devices.

Vehicles (e.g., land-based vehicles, aircraft, watercraft, etc.) are typically controlled by an operator. For example, a plane may have a pilot to control its motion during flight. Similarly, a boat may have a crew to control its motion while at sail, and a car may have a driver to control its motion while on a road. To control a vehicle, an operator may interact directly with control componentry of the device, such via physical contact with the componentry. Some vehicles can be controlled by the operator remotely, for example, by interacting with a remote control system.

DETAILED DESCRIPTION

Figure 1A:
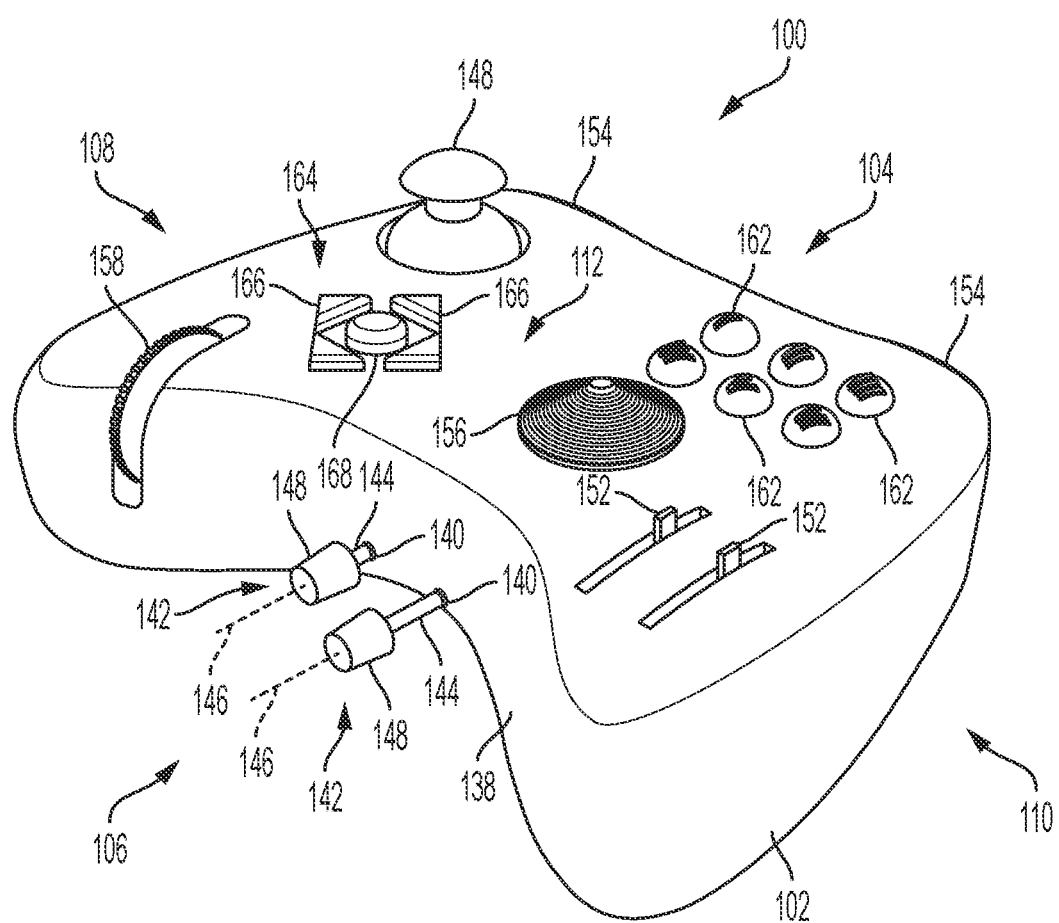
FIG. 1A is a schematic diagram, in rear perspective view, of an example handheld controller device for controlling a simulated or remotely controlled aircraft.

In a general aspect, handheld devices provide control data based on input from a user of the handheld device. In some cases, the handheld devices can be used in a simulator system, which may be computer-implemented. Moreover, the control data may be provided to a computing device (or computer system) running a simulation, such as to control a simulated vehicle. In some cases, the handheld devices can be used in connection with a physical vehicle (e.g., a remotely controlled vehicle), and the control data are provided to the physical vehicle to control the vehicle remotely. A handheld device may include input devices or mechanisms that are configured to provide control functionality similar to that provided by the control componentry of the physical vehicle, such as that found onboard the physical vehicle. The input devices or mechanisms may interact with the fingers or thumbs of a user to generate control data for the simulated or physical vehicle. Examples of such input devices or mechanisms include joysticks, slidable knobs, triggers, buttons, bumper buttons, hat switches, wheels, D-pads, and so forth. In many implementations, the input devices or mechanisms can be bound and mapped to selective functions of the vehicle's control componentry based on a preference or need of a user of the handheld device.

In some examples, a handheld device may also include circuitry with sensors configured to measure a position or an orientation of the input devices or mechanisms. The circuitry may include electronics that allow the handheld device to communicate with a computing device of the simulated or physical vehicle. The computing device may include one or more computing processors coupled to one or more memories. For example, the computing device may be a computer executing instructions for a simulator program (e.g., a flight simulator or another type of vehicle simulator). The computing device may also be part of a control system for a drone or unmanned aerial vehicle (UAV). Other types of computing devices are possible.

In some examples, a handheld device may provide advantages over larger systems used to control simulated or physical vehicles. For instance, a flight control system may incorporate hardware for a hands-on throttle-and-stick (HOTAS) or a yoke. These systems typically supplement such hardware with one or more additional pieces of hardware—such as rudder pedals, trim wheels, throttle quadrants, and so forth—to allow full control of a simulated aircraft or a remotely controlled aircraft. The exact combination may depend on the specific aircraft to be controlled. However, the resulting assemblage of hardware is bulky and can require a considerable financial investment to acquire. In contrast, a handheld device can consolidate such bulky and expensive hardware into a single compact body that is accessible, space-friendly, and portable.

In some examples, a handheld device may provide advantages for individuals interested in vehicle simulations, such as on a gaming laptop, through a game streaming service, a simulation mobile app, or on a gaming console. For example, individuals new to simulations may see a lower cost of entry when purchasing a handheld device. Moreover, the compact nature of a handheld device may allow the individuals to avoid dedicating personal living space (e.g., an office, a bedroom, etc.) to a large assembly of control components (e.g., a virtual cockpit). The compact nature of a handheld device may also allow for the control of a simulated vehicle in spaces impractical for larger systems. For example, an individual may use the handheld device while lounging on a couch in a living room, whereas the deployment of HOTAS (or yoke) and pedal hardware in such spaces may be impractical. Experienced individuals may also value the portable nature of a handheld device, such as when playing vehicle simulations games during travel.

In some examples, a handheld device may also provide advantages in controlling remotely controlled vehicles, including aircraft, watercraft, and land-based vehicles—especially if such vehicles are drones or unmanned aerial vehicles. For example, the compact nature of the handheld device may allow for its convenient transportation to off-site or remote areas. Such areas are typically amenable to the operation of a remotely controlled vehicle, as the vehicle may require travel paths through large open spaces. The off-site or remote areas may also allow for a direct line-of-sight to the remotely controlled vehicle, which can be useful in ensuring that the remotely controlled vehicle stays within the communication range of the handheld device. The portable nature of a handheld device may also allow a user or operator to move along with the remotely controlled vehicle, such as to accommodate a desired travel path. In contrast, the deployment of multi-hardware systems off-site or in a remote area may be impractical due to their large bulk and power requirements.

In some cases, the handheld device may be in communication with a computing device during operation of a remotely controlled vehicle. The computing device may include a presentation device, such as a screen, and a wireless communication interface, such as a radio. For example, the computing device could be a mobile computing device, such as laptop or a tablet. During operation, the computing device may exchange data with the remotely controlled vehicle via the wireless communication interface. The data may include control data from the handheld device and possibly other types of data (e.g., image data generated by a camera on the remotely controlled vehicle). The portable nature of both the handheld device and the portable computing device may allow the user improved control with the remotely controlled vehicle.

In many implementations, a handheld device includes an input device or mechanism based on a counter-moving pair of triggers (or trigger pads). In particular, the handheld device may include a pair of triggers extending outward from a side (e.g., a front side, a top side, a bottom side, etc.) that are configured to move along respective trigger paths. A coupling assembly connected to the pair of triggers can transfer motion between the pair of triggers such that, when either of the pair of triggers moves along its trigger path towards a housing of the handheld device, the coupling assembly moves the other trigger away (e.g., an equal distance away) from the housing along its respective trigger path.

In examples involving aircraft, a counter-moving pair of triggers may be used to control the position of one or more flight control surfaces on a simulated aircraft or a physical aircraft. Such control may allow the handheld device to control one or both of a direction and a speed of the simulated or physical aircraft. For example, the counter-moving pair of triggers may be pivoted back and forth to move a rudder back and forth. The rudder defines one or more flight control surfaces that may influence a yaw of the simulated or physical aircraft during flight. As another example, the counter-moving pair of triggers may be pivoted back and forth to move a pair of ailerons back and forth in opposing motion. The pair of ailerons define flight control surfaces that may influence a roll of the simulated or physical aircraft during flight. In general, the one or more flight control surfaces may be defined by a body capable of moving continuously between two positions in order to change an aerodynamic drag or lift experienced by the simulated or physical aircraft. In these examples, the physical aircraft may be a remotely controlled flyable aircraft.

The yaw, pitch, and roll may correspond to rotations of an aircraft relative to a set of orthogonal axes defined by a body of the aircraft. For example, the wings of the aircraft may define a first axis of rotation associated with a pitch of the aircraft, i.e., rotation of the aircraft about the first axis of rotation alters a pitch of the aircraft. Similarly, the fuselage of the aircraft may define a second axis of rotation. The second axis of rotation passes through the first axis at an intersection point and is perpendicular to the first axis. The second axis of rotation may be associated with a roll of the aircraft, i.e., rotation of the aircraft about the second axis of rotation alters a roll of the aircraft. Lastly, a third axis of rotation passes through the intersection point and is perpendicular to the first and second axes. The third axis of rotation may be associated with a yaw of the aircraft, i.e., rotation of the aircraft about the third axis of rotation alters a yaw of the aircraft. It will be appreciated that the intersection point serves as an origin for the orthogonal axes, and in certain cases, corresponds to a center of mass for the aircraft.

In some implementations, the one of more flight control surfaces are primary flight control surfaces on a fixed-wing aircraft. Examples of the primary flight control surfaces include those defined by a rudder on a vertical stabilizer, an aileron on a wing, or an elevator on a horizontal stabilizer. In some implementations, the one or more flight control surfaces are secondary flight control surfaces on the fixed-wing aircraft. Examples of the secondary flight control surfaces include those defined by a moveable structure on a wing or horizontal stabilizer, such as flap, a spoiler (or air brake), or a slat or Kruger flap. In some implementations, the one or more flight control surfaces are hybrid flight control surfaces on a fixed-wing aircraft. Examples of the hybrid flight control surfaces include an elevon, a flaperon, or a spoileron. The one or more flight control surfaces may also correspond to those on a rotary-wing aircraft, such as a helicopter. For example, the one or more flight control surfaces may be defined by a set of tail rotor blades having a selectively variable blade pitch.

Aspects of the discussion below refer to simulated or physical aircraft as an example vehicle that can be controlled by a handheld controller device. However, the handheld devices described in the present disclosure can also be used with a variety of other types of vehicles, including watercraft (e.g., boats, jet skis, submarines, underwater drones, etc.), land vehicles (e.g., automobiles, trucks, motorcycles, tanks, hovercraft, snowmobiles, etc.), and so forth.

Figure 1B:
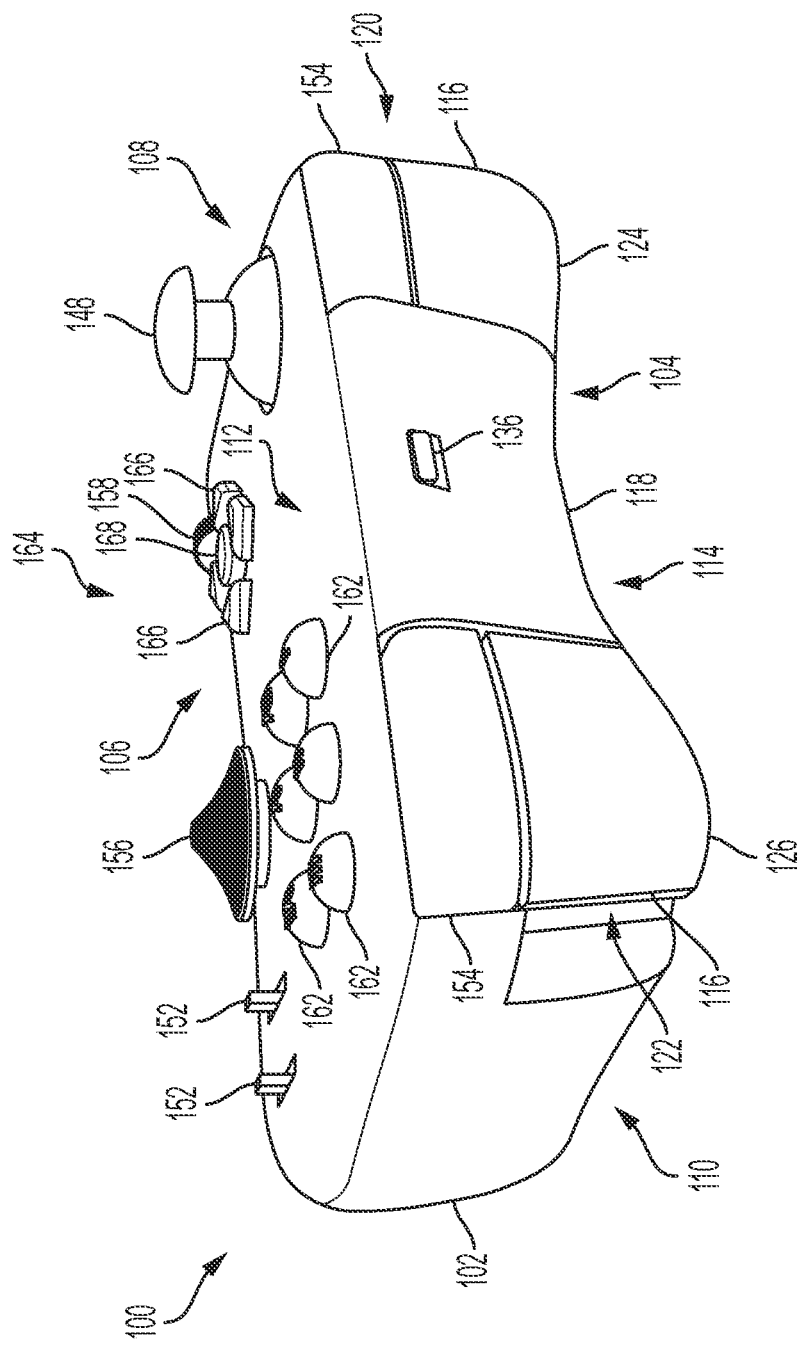
FIG. 1B is a schematic diagram of the example handheld controller device of FIG. 1A, but from a front perspective view.
Figure 1C:
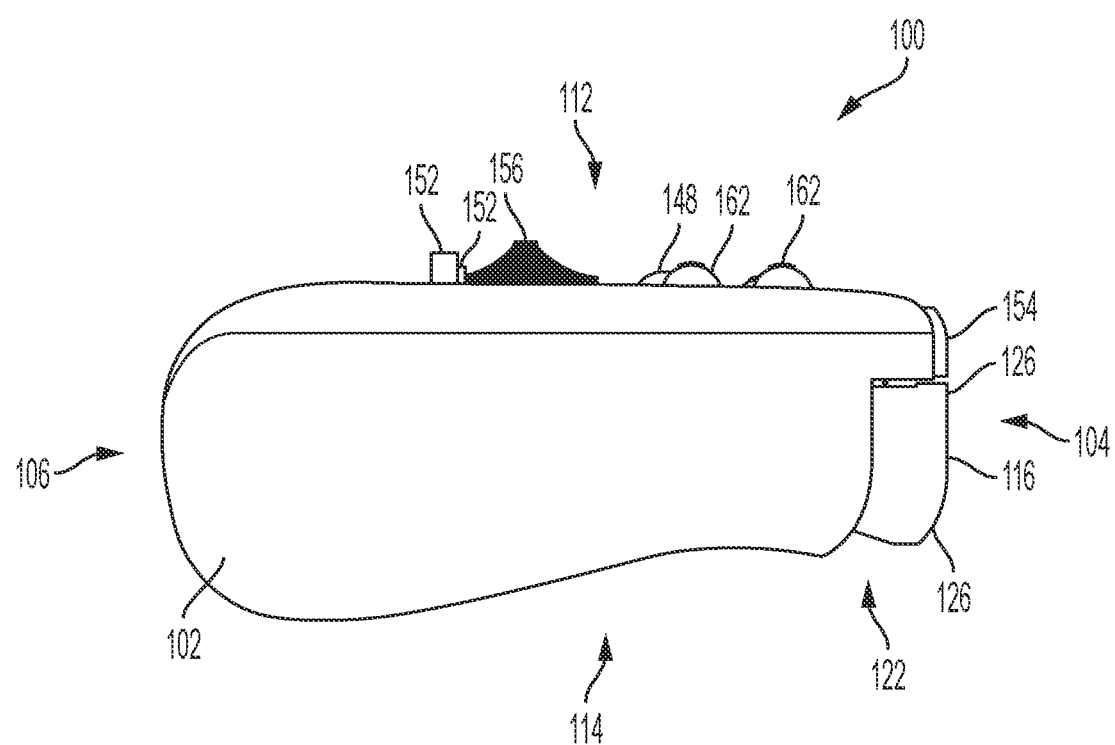
FIG. 1C is a schematic diagram of the example handheld controller device of FIG. 1A, but from a right-side view.

Now referring to FIG. 1A, a schematic diagram is presented, in a rear perspective view, of an example handheld controller device 100. The example handheld controller device may be used for controlling a simulated or remotely controlled flyable aircraft. However, other types of vehicles of vehicles are possible. FIGS. 1B and 1C present schematic diagrams of the example handheld controller device 100 of FIG. 1A, but from a front perspective view and a right-side view, respectively. The example handheld controller device 100 includes a housing 102 configured to be held in the hands of a user. The housing 102 may define sides of the example handheld controller device 100, such as a front side 104, a rear side 106, a left side 108, a right side 110, a top side 112, and a bottom side 114. Other sides may be possible, depending on a shape of the housing 102. The housing 102 may be shaped ergonomically to contact one or both hands of a user during operation of the example handheld controller device 100. For example, the left side 108 and the right side 110 may be defined by contoured walls that are shaped to accommodate interior surfaces of, respectively, the left and right hands of the user (e.g., surfaces of the left and right palms).

The example handheld controller device 100 also includes input devices or mechanisms for the user to transmit commands, via the example handheld controller device 100, to the simulated aircraft or the physical aircraft. The commands may allow the user to control one or both of a direction and a speed of the simulated or remotely controlled flyable aircraft. Examples of the interactive devices or mechanisms include joysticks, slidable knobs, triggers, buttons, bumper buttons, hat switches, wheels, D-pads, and so forth. In many implementations, the example handheld controller device 100 includes a trigger assembly having a pair of triggers 116 extending outward from a side of the example handheld controller device 100. The pair of triggers 116 are configured to move along respective trigger paths. Although FIG. 1A depicts the pair of triggers 116 as extending outward from the front side 104, other sides are possible (e.g., the top side 112, the bottom side 114, the rear side 106, etc.). Moreover, although FIG. 1A depicts a single pair of triggers, multiple pairs of triggers are possible.

The trigger assembly also includes a coupling assembly disposed inside the housing 102 and connected to the pair of triggers 116. The coupling assembly is configured to transfer motion between the pair of triggers 116 such that, when either of the triggers 116 moves towards the housing 102 along its trigger path, the coupling assembly moves the other trigger away (e.g., an equal distance away) from the housing 102 along its respective trigger path. In many variations, the housing 102 includes a wall 118 that defines the side (e.g., the front side 104) and has first and second openings 120, 122 therethrough. In these variations, the pair of triggers 116 includes a first trigger arm extending from a first trigger pad 124 (or first pad) into the first opening 120 and terminating in a first trigger end. The pair of triggers 116 also includes a second trigger arm extending from a second trigger pad 126 (or second pad) into the second opening 122 and terminating in a second trigger end. Representative examples of trigger assembly and the coupling assembly are described in further detail in relation to FIGS. 2A-4.

Figure 1D:
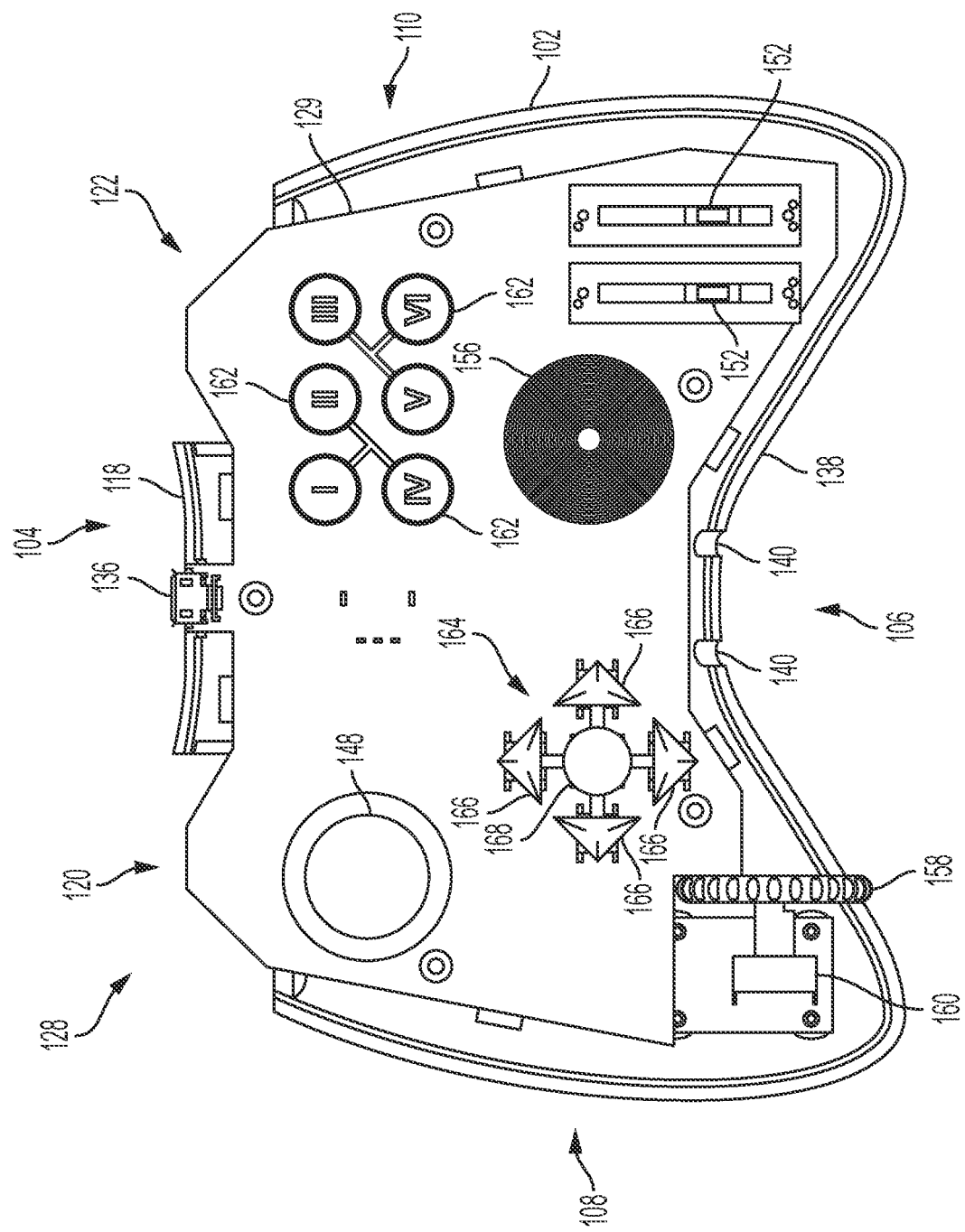
FIG. 1D is a schematic diagram, in top view, of an interior portion of the example handheld controller device of FIG. 1A.
Figure 1E:
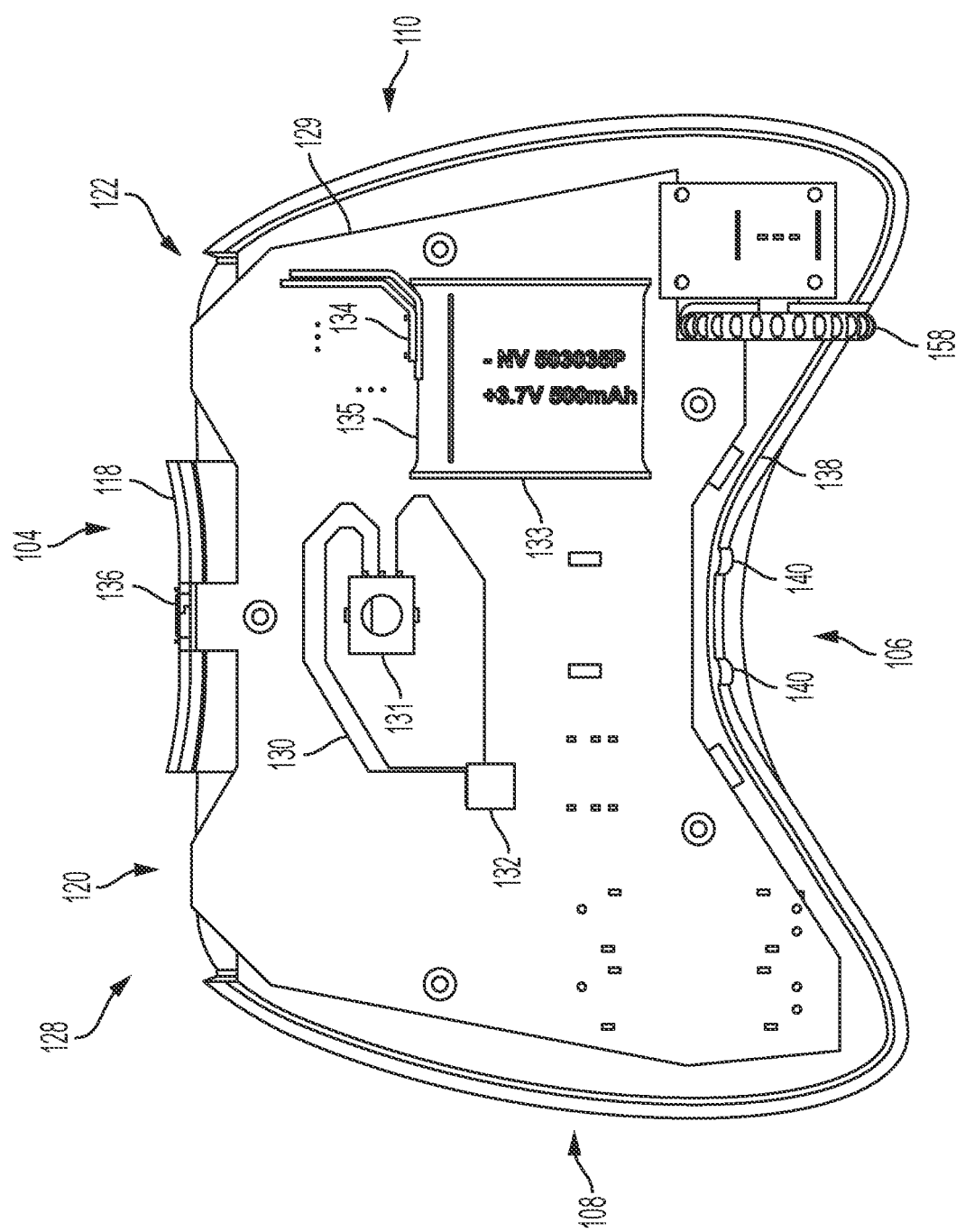
FIG. 1E is a schematic diagram, in bottom view, of the interior portion of FIG. 1D.
Figure 1F:
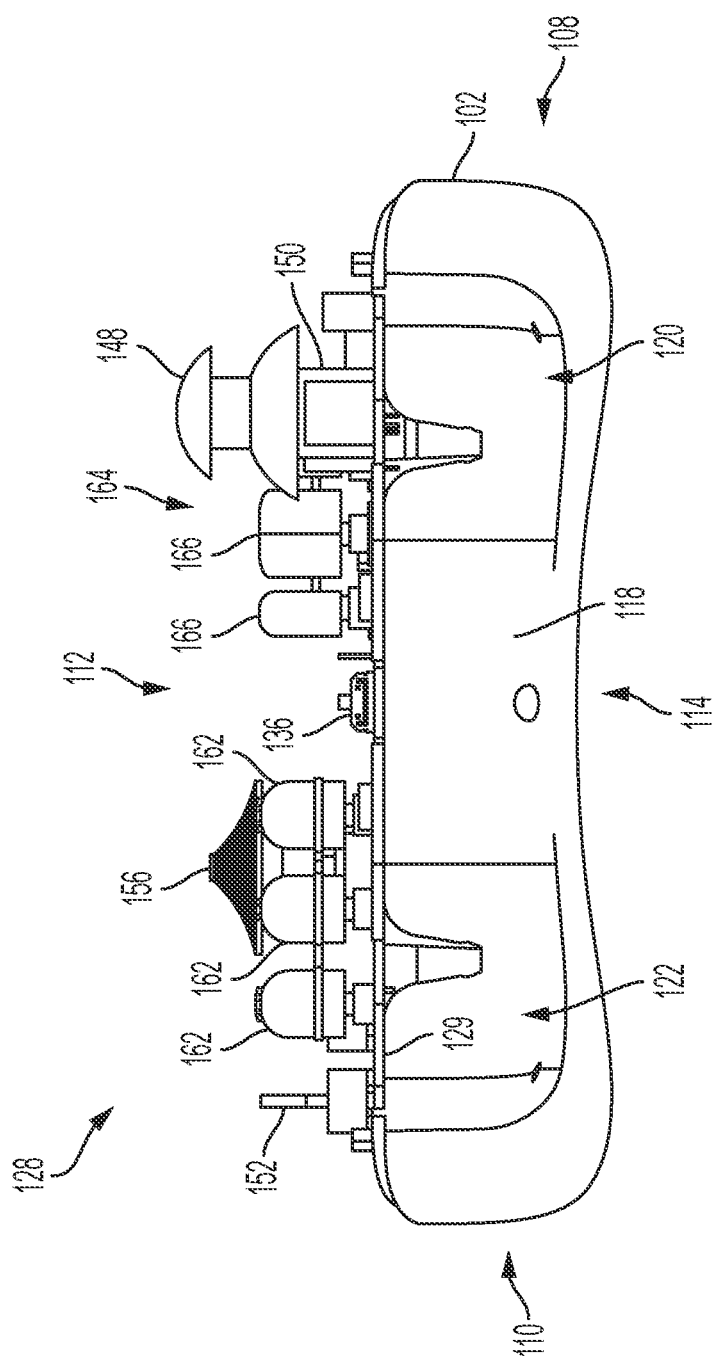
FIG. 1F is a schematic diagram, in front-side view, of the interior portion of FIG. 1D.

The example handheld controller device 100 additionally includes circuitry disposed in the housing 102, such as on a printed circuit board (PCB). FIG. 1D presents a schematic diagram, in top view, of an interior portion 128 of the example handheld controller device 100 of FIG. 1A. FIGS. 1E-1F present schematic diagrams, in respective bottom and front-side views, of the interior portion 128 of FIG. 1D. Certain features of the example handheld controller device 100 of FIG. 1A have been omitted from FIGS. 1D-1F for clarity. The interior portion 128 includes a printed circuit board 129 that provides electrically conductive traces 130 for the circuitry. For clarity, only some of the electrically conductive traces 130 are shown by FIGS. 1D-1F. The circuitry, which may comprise the electrically conductive traces 130, includes one or more sensors 131 configured to generate sensor signals based on positions of the pair of triggers 116 along their respective trigger paths. The one or more sensors 131 may sense the positions of pair of triggers 116 either directly or indirectly. For indirect sensing, the one or more sensors 131 may, for example, sense the position of a component coupled to the pair of triggers 116, such as a mechanical linkage or a magnet. Examples of the one or more sensors 131 include a rotary potentiometer or a Hall effect sensor.

The circuitry also includes a microcontroller 132 (e.g., a microprocessor) configured to receive the sensor signals and, in response, generate aircraft control data for the simulated or remotely controlled flyable aircraft. The microcontroller 132 may be electrically coupled to the one or more sensors 131 by the electrically conductive traces 130. In some variations, the circuitry includes a battery receptacle 133 having electrical contacts 134 for coupling to a battery 135, such as a primary (or non-rechargeable) or secondary (or rechargeable) battery. The battery receptacle 133 may be configured to allow the battery 135 to be removable, thereby allowing for its replacement. In FIG. 1E, the battery 135 is depicted as a secondary battery.

In some variations, the circuitry may include power control electronics configured to regulate electrical power received by the example handheld controller device 100. The power control electronics may regulate one or both of an operating voltage and an operating current needed to operate the example handheld controller device 100. For example, the power control electronics may regulate an operating voltage and an operating current for the one or more sensors 131, the microcontroller 132, or both. The power control electronics may also regulate one or both of a charging voltage and a charging current supplied to the battery receptacle 133 to charge a secondary battery. In some variations, the power control electronics allows the user to operate the example handheld controller device 100 while the secondary battery is being charged.

In some implementations, the example handheld controller device 100 includes a port 136, which may define part or all of a wired communication interface for the circuitry. The port 136 may be configured to couple to an electrical cable, such as a universal serial bus (USB) cable, an Ethernet cable, or another type of communication channel. The electrical cable, when plugged into the port 136, may allow electrical signals to be transmitted between the example handheld controller device 100 and a computing device, such as a gaming console, a desktop computer, a laptop computer, a smartphone, a tablet, a gamepad with integrated display, and so forth. The electrical signals may represent data, such as aircraft control data for controlling the simulated or remotely controlled flyable aircraft. The computing device includes one or more computer processors that can execute software, firmware, or a combination thereof. For instance, the computing device can be a computer configured to execute instructions of a flight simulator program for the simulated aircraft. In some cases, the computing device is part of the control system for a remotely controlled flyable aircraft. The electrical cable may also serve as a conduit of electrical power to the example handheld controller device 100. In such cases, the port 136 may be electrically coupled to the power control electronics of the circuitry. Such coupling may allow the port 136 to supply power to example handheld controller device 100, such as for operation of the example handheld controller device 100 and charging of a secondary battery in the example handheld controller device 100.

In some implementations, the example handheld controller device 100 includes a transceiver (or radio), which may define part or all of a wireless communication interface for the circuitry. The transceiver may be configured to send and receive wireless signals (e.g., radio frequency signals) representing data, such as aircraft control data for controlling the simulated or remotely controlled flyable aircraft. The wireless signals may be transmitted between the example handheld controller device 100 and a computing device, such as a gaming console, a desktop computer, a laptop computer, a smartphone, a tablet, a gamepad with integrated display, and so forth. In some cases, the transceiver is configured send wireless signals according to a short-range communication standard, such as BLUETOOTH®, Near Field Communication (NFC), or ZigBee. In other cases, the transceiver is configured to send wireless signals according to one or more of the 802.11 family of standards developed by IEEE (e.g., a Wi-Fi network standard). In yet other cases, the transceiver is configured send wireless signals according to a cellular network standard. Examples of such standards include 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and 5G standards. Other wireless signal standards are possible. Moreover, the example handheld controller device 100 may include multiple transceivers, each dedicated to a single wireless signal standard.

During operation, the example handheld controller device 100 is placed in communication with an external computing device using one or both of the wired or wireless communication interfaces. In cases where the example handheld controller device 100 controls a simulated aircraft, the computing device may be a computer configured to execute instructions of a flight simulator program. The computer may be a gaming console, such as a desktop computer, a laptop computer, a smartphone, a tablet, a gamepad with integrated display, and so forth. In cases where the example handheld controller device 100 controls a remotely controlled flyable aircraft, the computing device may be part of a control system of the remotely controlled flyable aircraft and may be in communication with an actuator subsystem of the control system. For example, the computing device may include one or more computer processors in communication with the actuator subsystem. The actuator subsystem may be configured to move a moveable body that defines one or more physical flight control surfaces for the remotely controlled flyable aircraft.

The user of the example handheld controller device 100 may displace the pair of triggers 116 along their respective trigger paths in opposite directions. As either of the triggers moves towards the housing 102 along its trigger path, the coupling assembly moves the other trigger away (e.g., an equal distance away) from the housing 102 along its respective trigger path. In response, the one or more sensors 131 generate sensor signals based on the positions of the pair of triggers 116 along their respective paths. The positions of the pair of triggers 116 may be sensed by the one or more sensors 131 either directly or indirectly. The microcontroller 132 then receives the sensor signals and generates aircraft control data for the simulated or remotely controlled flyable aircraft. The aircraft control data is transmitted to the computing device, where the aircraft control data is used to alter the position of one or more flight surfaces of the simulated or remotely controlled flyable aircraft. In many variations, the user configures the computing device in advance to associate the aircraft control data with one or more target flight control surfaces (or a body defining the one or more target flight control surfaces), thereby allowing the pair of triggers 116 to control a yaw, a pitch, or a roll of the simulated or remotely controlled flyable aircraft.

In some instances, the aircraft control data is associated with one or more flight control surfaces controlling a yaw of the simulated or remotely controlled flyable aircraft. For example, the one or more flight control surfaces may be defined by a rudder located on a trailing edge of a vertical stabilizer. The one or more flight control surfaces may also be defined by a tail rotor blade located on a tail of a helicopter. In some instances, the aircraft control data is associated with one or more flight control surfaces controlling a pitch of the simulated or remotely controlled flyable aircraft. For example, the one or more flight control surfaces may be defined by a pair of elevators located on a trailing edge of a horizontal stabilizer and on opposite sides of the horizontal stabilizer. In some instances, the aircraft control data is associated with one or more flight control surfaces controlling a roll of the simulated or remotely controlled flyable aircraft. For example, the one or more flight control surfaces may be defined by a pair of ailerons located on, respectively, left- and right-side wings of the simulated or remotely controlled flyable aircraft. In some instances, the aircraft control data is associated with other flight control surfaces, such as secondary and hybrid flight control surfaces.

If the example handheld controller device 100 is used to control a simulated aircraft, the one or more control surfaces may correspond to simulated flight control surfaces of the simulated aircraft. In this case, the computing device may generate graphical data based on the position (or altered position) of the one or more simulated flight control surfaces. The graphical data may represent a position and an orientation of the simulated aircraft in a simulated environment. If the example handheld controller device 100 is used to control a remotely controlled flyable aircraft, the one or more control surfaces may correspond to physical flight control surfaces of the remotely controlled flyable aircraft. In this latter case, the computing device (or one or more computer processors) may generate motion signals based on the aircraft control data from the example handheld controller device 100. The motion signals may then be sent to the actuator subsystem, which in turn, moves a moveable body (or bodies) that defines the one or more physical flight control surfaces.

The example handheld controller device 100 may include other input devices or mechanisms for controlling the simulated or remotely controlled flyable aircraft. In some implementations, the housing 102 of the example handheld controller device 100 includes a wall 138 having a hole 140 therethrough. FIG. 1A depicts the wall 138 as defining the rear side 106 of the housing 102 but other sides are possible. In these implementations, the example handheld controller device 100 includes a slider assembly 142 having a shaft 144 disposed through the hole 140 and configured to move along a slider path 146. Moreover, the circuitry includes a second sensor configured to generate second sensor signals based on a position of the slider assembly 142, and the microcontroller 132 is further configured to receive the second sensor signals and, in response, generate second aircraft control data for the simulated or remotely controlled flyable aircraft. Although FIG. 1A depicts the example handheld controller device 100 as having two slider assemblies 142, other numbers of slider assemblies are possible (e.g., one, three, etc.). In certain instances, such as shown in FIG. 1A, the slider assemblies 142 each include a knob 148 connected to the shaft 144 outside of the housing 102.

During operation, the user of the example handheld controller device 100 may pull or push the slider assembly 142 along the slider path 146. In response, the second sensor generates second sensor signals based on a position of the slider assembly 142. The microcontroller 132 then receives the second sensor signals and generates the second aircraft control data for the simulated or remotely controlled flyable aircraft. The second aircraft control data is transmitted to the computing device, where the second aircraft control data is used to alter a flight control parameter of the simulated or remotely controlled flyable aircraft. The flight control parameter may represent an operational characteristic of the simulated or remotely controlled flyable aircraft. For example, the flight control parameter may be a throttle for an engine of the simulated or remotely controlled flyable aircraft. As another example, the flight control parameter may be an air-to-fuel mixture for an engine of the simulated or remotely controlled flyable aircraft. In yet another example, the flight control parameter may be an angle of attack for propeller blades of the simulated or remotely controlled flyable aircraft. The angle of attack may influence a rotational speed of the propeller blades.

In some implementations, the example handheld controller device 100 includes a finger joystick 148 and corresponding sensor 150 that allows the user to control a pitch and a roll of the simulated or remotely controlled flyable aircraft. For example, a vertical motion of the finger joystick 148 may control the pitch and a horizontal motion of the finger joystick 148 may control the roll. The vertical motion may occur along a direction extending from the front side 104 of the housing 102 to a rear side 106 of the housing 102. The horizontal motion may occur along a direction extending from a left side 108 of the housing 102 to a right side 110 of the housing 102.

In some implementations, the example handheld controller device 100 includes a slider 152 and corresponding sensor that can be assigned to various flight control parameters. The slider 152 may be analog input device. Examples of the flight control parameters include a radio frequency for communicating with air traffic control, an angular velocity of a propeller, a cockpit light brightness, a throttle for an aircraft engine, an air-to-fuel mixture for an aircraft engine, an angle of attack for a propeller blade, and so forth. In some instances, the slider 152 and corresponding sensor may be assigned to one or more secondary flight control surfaces, such as a flap on a wing. The flap may help the user maintain control of the simulated or remotely controlled flyable aircraft in low-speed conditions (e.g., during takeoff and landing).

In some implementations, the example handheld controller device 100 includes a bumper button 154 and corresponding sensor. The bumper button 154 may reside on a same side of the housing 102 as the pair of triggers 116, such as shown in FIGS. 1A-1C. Moreover, the bumper button 154 may reside above a trigger 116 and be flush therewith. The user may assign the bumper button 154 to a flight control parameter of the simulated or remotely controlled flyable aircraft, such a state of a parking brake (e.g., engaged or disengaged), the firing of ordnance or weaponry, or a state of an autopilot function (e.g., on or off). For applications involving flight simulation, the user may also assign the bumper button 154 to interact with a graphical user interface (GUI), such as selecting a degree of camera zoom displayed by the graphical user interface.

In some implementations, the example handheld controller device 100 includes a hat switch 156 and corresponding sensor. The hat switch 156 may be configured as a directional control that moves in four directions, for example, from a default position towards the front side 104, the rear side 106, the left side 108, and the right side 110, respectively. For applications involving flight simulation, the user may assign the hat switch 156 to interact with a graphical user interface, such as selecting a target displayed on the graphical user interface or changing between camera views of the graphical user interface.

In some implementations, the example handheld controller device 100 includes a wheel 158 and corresponding sensor 160 (e.g., a rotary encoder). The wheel 158 may be configured to hold a target wheel position after the user disengages their finger or thumb from the wheel 158. In this configuration, the wheel 158 may relieve the user from having to maintain an orientation (e.g., a pitch) of the simulated or remotely controlled flyable aircraft during flight. For example, by using the wheel 158 instead of the finger joystick 148, the user may avoid having to persistently hold the finger joystick 148 in a canted position to maintain a pitch of the simulated or remotely controlled flyable aircraft. In some instances, the user may assign the wheel 158 to control one or more flight surfaces defined by an elevator (or pair of elevators). The user may thereafter turn the wheel 158 up or down to alter a position of the elevator, thereby raising and lowering a nose of the simulated or remotely controlled flyable aircraft, respectively. Moreover, the user may leave the wheel 158 at a target wheel position to maintain the elevator at a desired position. The desired position of the elevator may counteract a tendency of the nose to dive in response to aerodynamic forces on the simulated or remotely controlled flyable aircraft during flight.

In some implementations, the example handheld controller device 100 includes a button 162 (or an array thereof), which serves as a digital input device. The button 162 is coupled to a button sensor, and the user may assign the button 162 to an arbitrary function based on preference. In some implementations, the example handheld controller device 100 includes a directional pad (or D-pad) 164 having a plurality of arrow buttons 166 and a central button 168. Each button in the directional pad 164 may be coupled to a respective button sensor. The plurality of arrow buttons 166 may include four arrow buttons pointing to, respectively, the front-side 104, the rear-side 106, the left-side 108, and the right-side 110 of the example handheld controller device 100. The user may assign the directional pad 164 to control an autopilot functionality or altitude of the simulated or remotely controlled flyable aircraft. For example, the left and right arrow buttons, when pressed, may increment an autopilot heading, and the front and rear arrow buttons, when pressed, may increment the altitude. For applications involving flight simulation, the user may assign the directional pad 164 to interact with a graphical user interface, such as selecting a camera or a camera view.

Although the input devices and mechanisms referenced above have been described in the context of certain assigned functions, it will be appreciated that these input devices and mechanisms may be assigned to other functions, as determined by the user. For example, multiple input devices and mechanisms may be applicable for assignment to a specific function of the simulated or remotely controlled flyable aircraft. However, the user may prefer a particular input device or mechanism for the specific function. The example handheld controller device 100 allows the user to make such custom assignments.

Figure 1G:
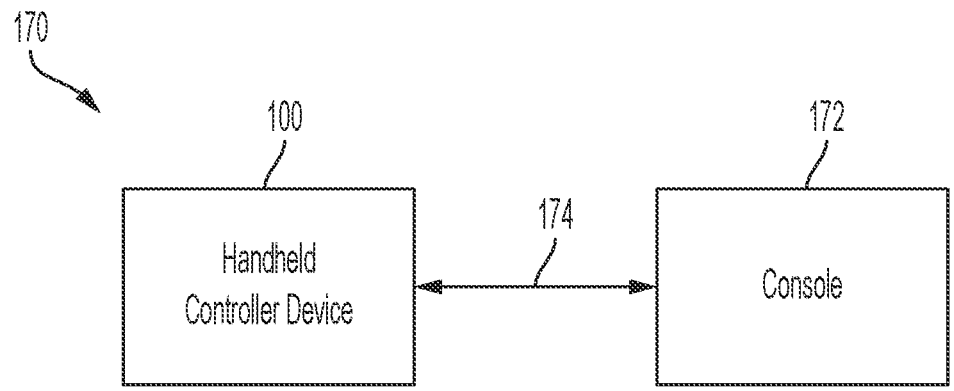
FIG. 1G is a block diagram of an example flight simulator system that includes the example handheld controller device of FIG. 1A and a console.

Now referring to FIG. 1G, a block diagram is presented of an example flight simulator system 170 that includes the example handheld controller device 100 of FIG. 1A and a console 172 (or gaming console). The console 172 may include one or more computer processors and may be configured to execute instructions of a flight simulator program. Examples of the console 172 include computing devices such as a workstation computer, a server computer, desktop computer, a laptop computer, a smartphone, a tablet, a gamepad with integrated display, and so forth. The example flight simulator system 170 also includes one or more communication channels 174 between the example handheld controller device 100 and the console 172. The one or more communication channels 174 may include unidirectional or bidirectional communication channels. FIG. 1G depicts the one or more communication channels 174 as a single bidirectional communication channel. In some variations, the one or more communication channels 174 include a wired communication link between the example handheld controller device 100 and the console 172. The wired communication link may connect a first wired communication interface of the example handheld controller device 100 (e.g., port 136) to a second wired communication interface of the console 172. In some variations, the one or more communication channels 174 include a wireless communication link between the example handheld controller device 100 and the console 172. The wireless communication link may connect a first wireless communication interface of the example handheld controller device 100 to a second wireless communication interface of the console 172.

Figure 1H:
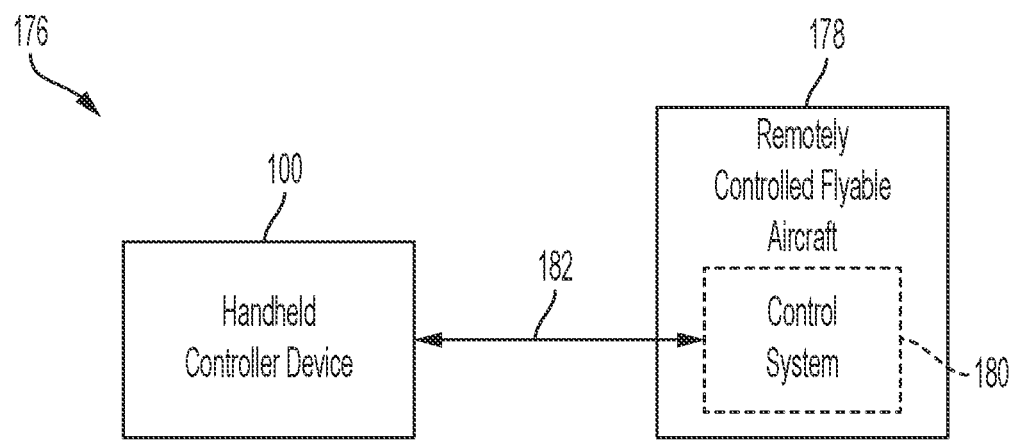
FIG. 1H is a block diagram of an example remote control system that includes the example handheld controller device of FIG. 1A and a remotely controlled flyable aircraft.

Now referring to FIG. 1H, a block diagram is presented of an example remote control system 176 that includes the example handheld controller device 100 of FIG. 1A and a remotely controlled flyable aircraft 178. The remotely controlled flyable aircraft 178 includes a control system 180 having one or more computer processors. The example remote control system 176 also includes one or more communication channels 182 between the example handheld controller device 100 and the control system 180 of the remotely controlled flyable aircraft 178. The one or more communication channels 182 may include unidirectional or bidirectional communication channels. FIG. 1H depicts the one or more communication channels 182 as a single bidirectional communication channel. In some variations, the one or more communication channels 182 include a wired communication link between the example handheld controller device 100 and the control system 180 of the remotely controlled flyable aircraft 178. The wired communication link may connect a first wired communication interface of the example handheld controller device 100 (e.g., port 136) to a second wired communication interface of the control system 180. In some instances, the one or more communication channels 182 include a wireless communication link between the example handheld controller device 100 and the control system 180 of the remotely controlled flyable aircraft 178. The wireless communication link may connect a first wireless communication interface of the example handheld controller device 100 to a second wireless communication interface of the control system 180.

Figure 2A:
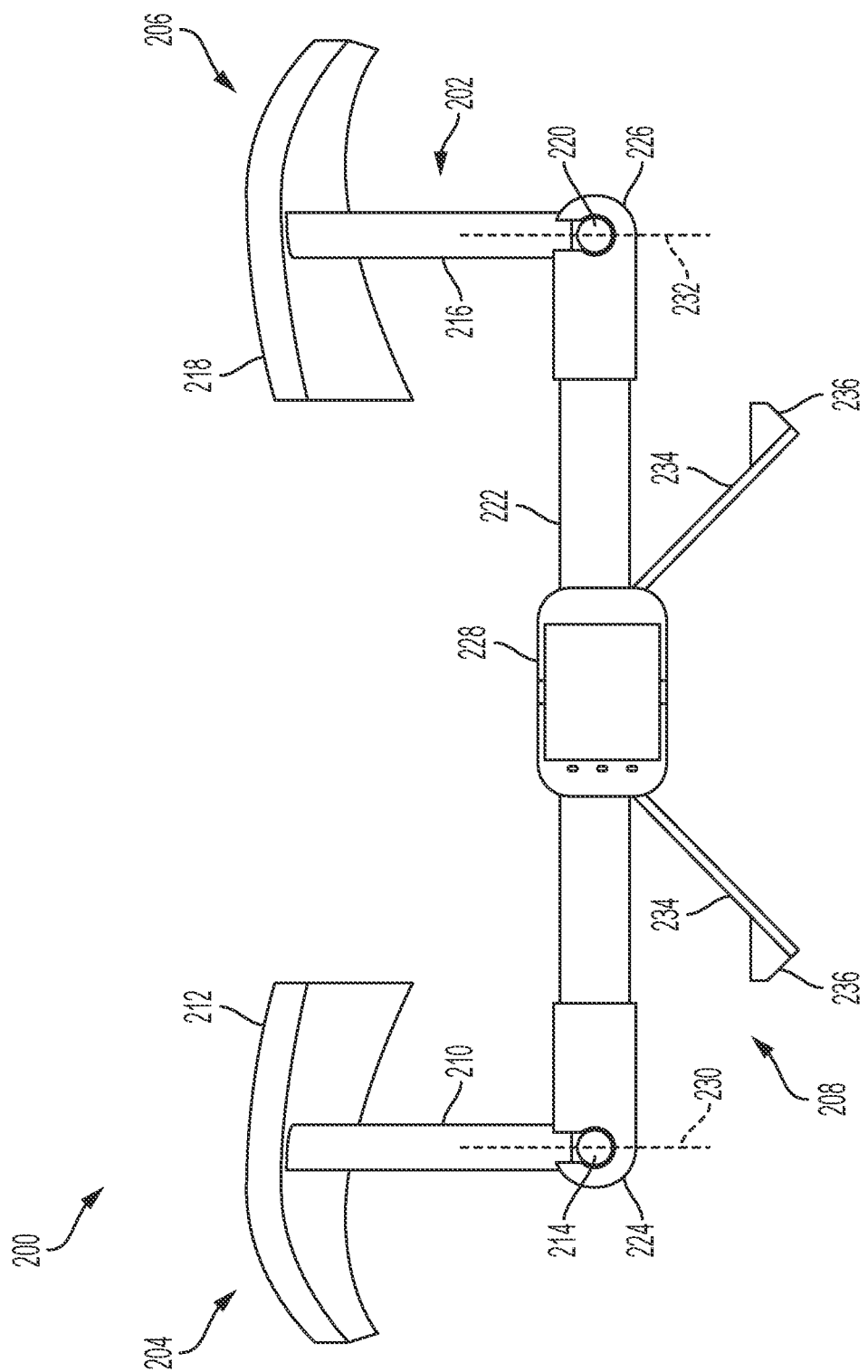
FIG. 2A is a schematic diagram is presented, in top view, of a portion of an example handheld controller device showing an example trigger assembly.

Now referring to FIG. 2A, a schematic diagram is presented, in top view, of a portion 200 of an example handheld controller device showing an example trigger assembly 202. The example trigger assembly 202 may be analogous to the trigger assembly described in relation to the example handheld controller device 100 of FIGS. 1A-1D. The example trigger assembly 202 includes a pair of triggers 204, 206 and a coupling assembly 208. A first 204 of the pair of triggers includes a first trigger arm 210 extending from a first trigger pad 212 into a first opening of a housing (not shown) and terminating in a first trigger end 214. A second 206 of the pair of triggers includes a second trigger arm 216 extending from a second trigger pad 218 into a second opening of a housing (not shown) and terminating in a second trigger end 220. The coupling assembly 208 includes a linkage 222 disposed in the housing and extending between first and second linkage ends 224, 226. The first and second linkage ends 224, 226 are rotatably coupled to, respectively, the first and second trigger ends 214, 220. The coupling assembly 208 also includes a swivel joint 228 coupling the linkage 222 to the housing. The swivel joint 228 may be connected to the linkage 222 between the first and second linkage ends 224, 226. Such connection may be at a midpoint of the linkage 222, as shown in FIG. 2A. However, other locations are possible.

In some instances, the one or more sensors may include a rotary potentiometer for sensing a position of the linkage 222 about the swivel joint 228 (e.g., to allow indirect sensing of a position of the pair of triggers 204, 206). In these instances, the rotary potentiometer may be coupled to the linkage 222 at the swivel joint 228. In some instances, the one or more sensors may include Hall effect sensor for sensing a position or orientation of the linkage 222 about the swivel joint 228 (e.g., to allow indirect sensing of a position of the pair of triggers 204, 206). In such instances, the Hall effect sensor may be placed proximate a magnet coupled to the linkage 222. The magnet may, for example, be coupled to the linkage 222 near one of the first and second linkage ends 224, 226, or alternatively, at the swivel joint 228. Other locations are possible.

In some variations, the first trigger 204 has a first trigger path 230 and a first default position thereon. Similarly, the second trigger 206 has a second trigger path 232 and a second default position thereon. In many instances, the first and second default positions are midway along, respectively, the first and second trigger paths 230, 232. FIG. 2A depicts the first and second triggers 204, 206 in their respective default positions. However, although FIG. 2A depicts the first and second trigger paths 230, 232 as being straight, the first and second trigger paths 230, 232 may be angled or curved, whether in whole or in part. A shape of the first and second trigger paths 230, 232 may depend on a configuration of the first and second triggers 204, 206 and the linkage 222, which influences a relative motion therebetween. In some instances, the first and second triggers 204, 206 and the linkage 222 are configured to provide straight (or substantially straight) first and second trigger paths 230, 232.

Figure 2B:
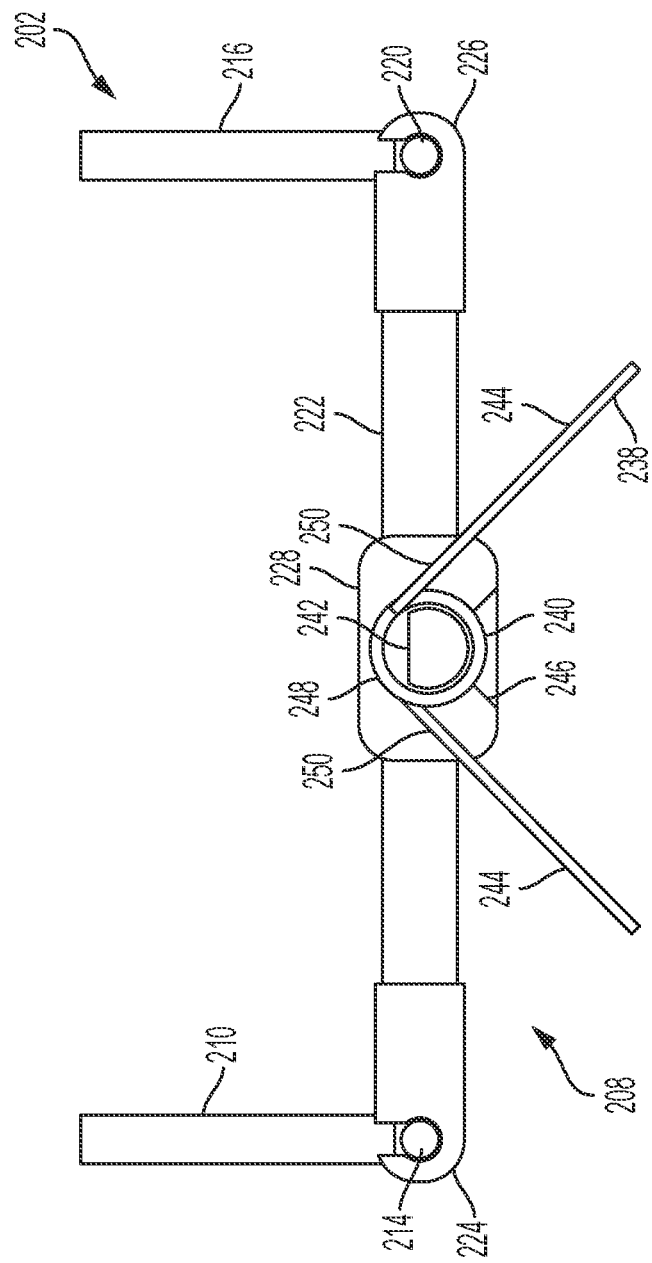
FIG. 2B is a schematic diagram, in top view, of the portion of the example handheld controller device of FIG. 2A, but with an internal portion of a swivel joint exposed to show a torsion spring.

In these variations, the example trigger assembly 202 may include one or more biasing elements 234 (e.g., springs, magnets, elastic bands, etc.) in the housing configured to bias the first and second triggers 204, 206 towards the first and second default positions, respectively. For example, the one or more biasing elements 234 may be a torsion spring or curved wire (e.g., a music wire) having ends disposed against respective support structures 236 (e.g., columns or posts). The support structures 236 may be coupled to (or part of) the housing. FIG. 2B presents a schematic diagram, in top view, of the portion 200 of the example handheld controller device of FIG. 2A, but with an internal portion of the swivel joint 228 exposed to show a torsion spring 238. Certain features of the example handheld controller device of FIG. 2A have been omitted from FIG. 2B for purposes of clarity. The torsion spring 238 has a coiled portion 240 disposed around a shaft 242, which extends from the housing. Extensions 244 of the torsion spring 238 are seated in a V-shaped channel 246 of the linkage 222. The linkage 222 includes a through-hole 248, in which, the shaft 242 resides. The through-hole 248 is nested within the V-shaped channel 246, and with the shaft 242, assists in defining the swivel joint 228. The V-shaped channel 246 may include side walls 250 that contact the extensions 244 when the linkage 222 pivots about the shaft 242. Such contact may induce a tension in the torsion spring 238 that resists motion of the linkage 222 from a default position.

Figure 2C:
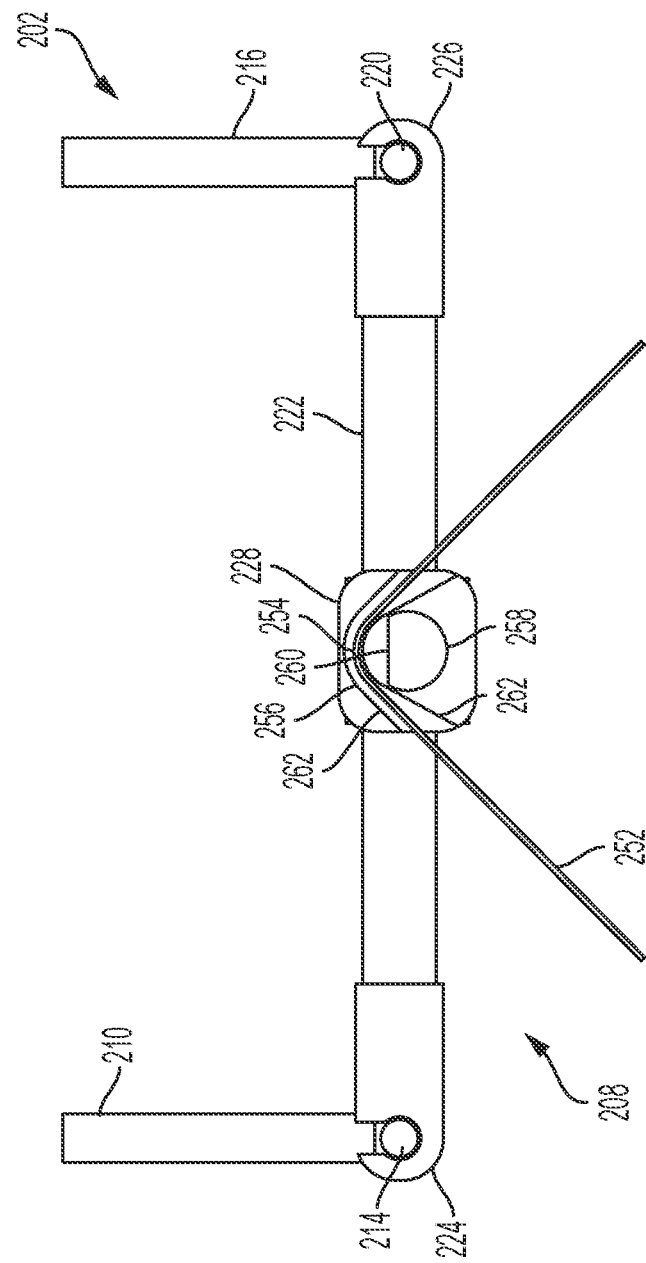
FIG. 2C is a schematic diagram a schematic diagram, in top view, of the portion of the example handheld controller device of FIG. 2A, but with an internal portion of a swivel joint exposed to show a curved wire.
Figure 2D:
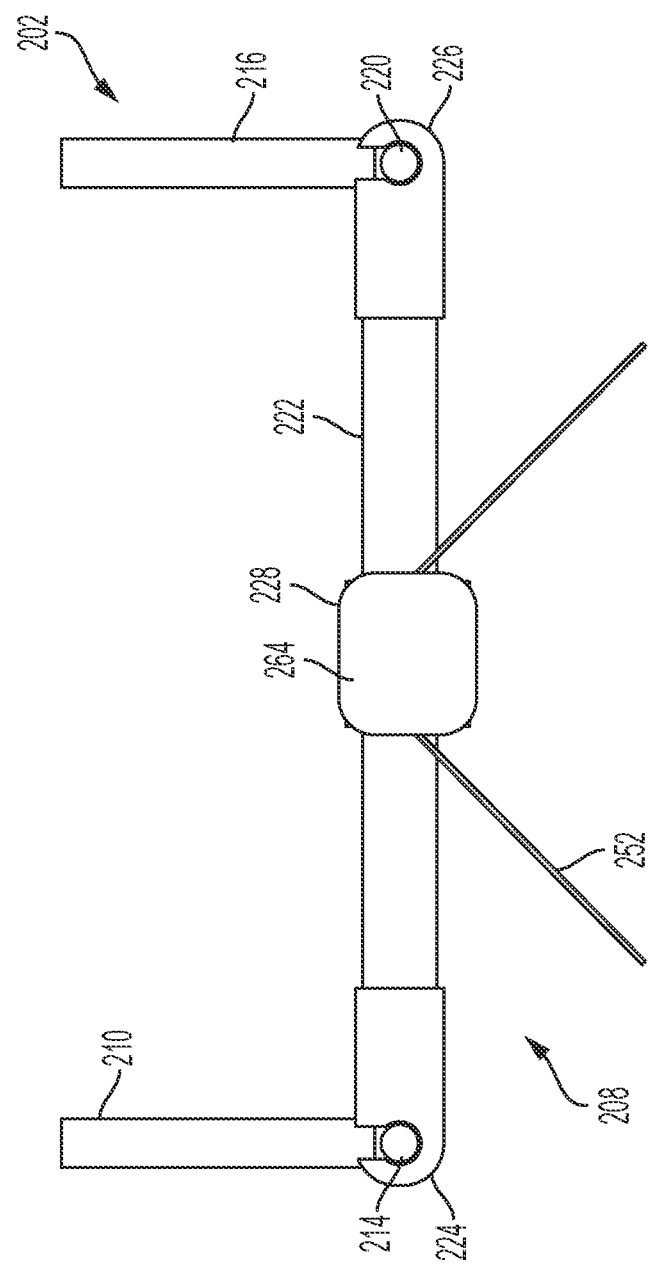
FIG. 2D a schematic diagram, in top view, of the portion of the example handheld controller device of FIG. 2C, but with a lid covering the swivel joint.

FIG. 2C presents a schematic diagram, in top view, of the portion 200 of the example handheld controller device of FIG. 2A, but with an internal portion of the swivel joint 228 exposed to show a curved wire 252 (e.g., a music wire). Certain features of the example handheld controller device of FIG. 2A have been omitted from FIG. 2C for purposes of clarity. The curved wire 252 has a bent or kinked portion 254 disposed in a channel 256 of the linkage 222. The channel 256 follows a curved path around a through-hole 258 of the linkage 222. Like FIG. 2A, a shaft 260 extends from the housing through the through-hole 258 to assist in defining the swivel joint 228. The channel 256 may include side walls 262 that contact the curved wire 252 when the linkage 222 pivots about the shaft 260. Such contact may induce a tension in the curved wire 252 that resists motion of the linkage 222 from a default position. FIG. 2D presents a schematic diagram, in top view, of the portion 200 of the example handheld controller device in FIG. 2C, but with a lid 264 covering the swivel joint 228.

Figure 3:
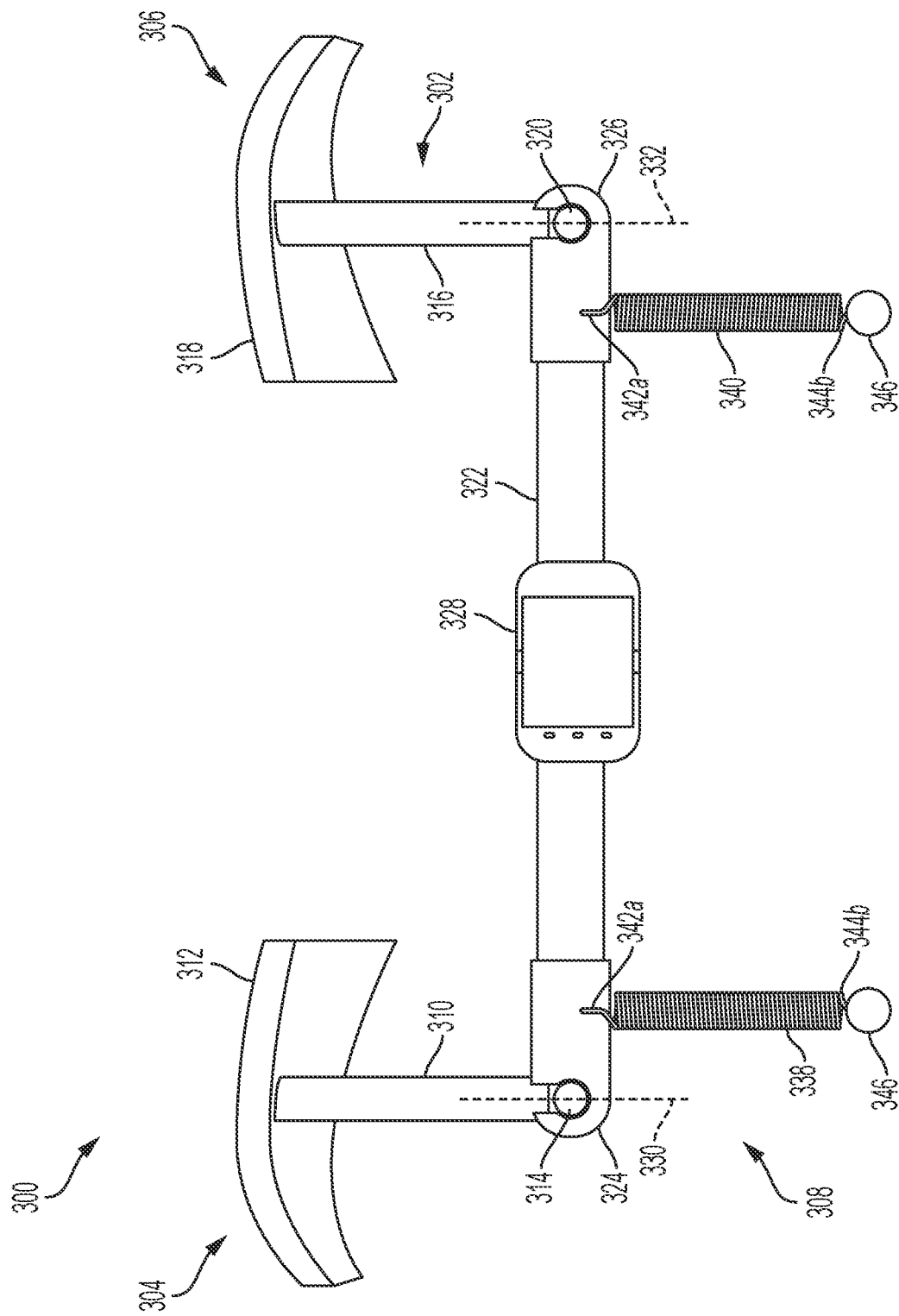
FIG. 3 is a schematic diagram, in top view, of a portion of an example handheld controller device showing an example trigger assembly with linear (or extension) springs as biasing elements.

Other means may be used to resist the motion of the linkage 222 from a default position and thereby establish the first and second default positions. FIG. 3 presents a schematic diagram, in top view, of a portion 300 of an example handheld controller device showing an example trigger assembly 302 with linear (or extension) springs 338, 340 as biasing elements. Features analogous to both FIGS. 3 and 2A are related via coordinated numerals that differ in increment by one hundred. Each linear spring 338, 340 has a first end 342 coupled to the linkage 322 and a second end 344 coupled to a mount point 346. The mount point 346 may be part of the housing or correspond to a separate body coupled to the housing. FIG. 3 depicts the first ends 342a, 342b of the linear springs 338, 340 coupled to the linkage 322 adjacent the first and second linkage ends 324, 326. However, other locations are possible. Moreover, although FIG. 3 depicts two linear springs, other numbers of linear springs are possible (e.g., one, three, etc.). The linear springs 338, 340 are operable to apply a force proximate each end of the linkage 322. The symmetrical coupling points of the linear springs 338 (relative to the swivel joint 328) allow their respective forces applied to the linkage 322 to balance. Such balance may establish a default position for the linkage 222. However, when the linkage 322 moves away from the default position, the linear springs 338 exert a counter torque that resists this motion, thereby biasing the linkage 322 towards the default position.

Figure 4:
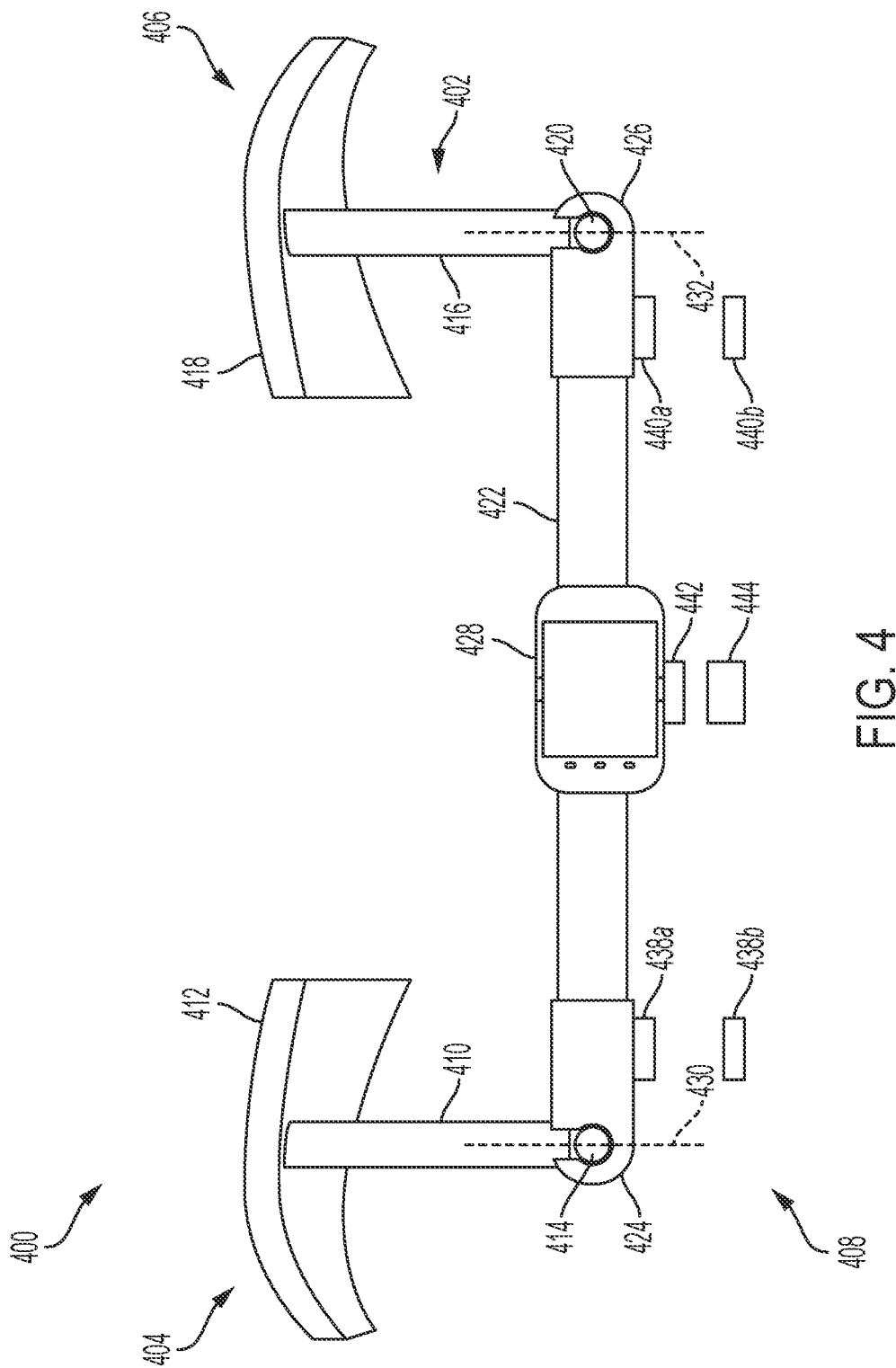
FIG. 4 is a schematic diagram, in top view, of a portion of an example handheld controller device showing an example trigger assembly with two pairs of magnets as biasing elements.

The biasing elements may rely on forces other than mechanical forces. For example, FIG. 4 presents a schematic diagram, in top view, of a portion 400 of an example handheld controller device showing an example trigger assembly 402 with two pairs of magnets 438, 440 as biasing elements. Features analogous to both FIGS. 4 and 2A are related via coordinated numerals that differ in increment by two hundred. The first pair of magnets 438 has a first magnet 438a coupled to the linkage 422 proximate the first linkage end 424 and a second magnet 438b coupled to a first mount point (not shown). The first magnet 438a and the second magnet 438b are separated from each other by a distance and may be oriented to have their respective magnetic poles establish a first magnetic repelling force. Similarly, the second pair of magnets 440 has a first magnet 440a coupled to the linkage 422 proximate the second linkage end 426 and a second magnet 440b coupled to a second mount point (not shown). The first magnet 440a and the second magnet 440b are separated from each other by a distance and may be oriented to have their respective magnetic poles establish a second magnetic repelling force. The symmetrical coupling points of the first magnets 438a, 440a (relative to the swivel joint 428) allows the first and second magnetic repelling forces applied to the linkage 422 to balance. Such balance may establish a default position for the linkage 222. However, when the linkage 422 moves away from the default position, one of the two pair of magnets 438, 440 exert a counter torque that resists this motion, thereby biasing the linkage 322 towards the default position.

In some variations, the example trigger assembly 402 may include a sensor magnet 442 coupled to the linkage 422, such as proximate one of the linkage ends 424, 426 or the swivel joint 428. FIG. 4 depicts the sensor magnet 442 as coupled to a center of the swivel joint 428. Other locations, however, are possible. In these variations, the one or more sensors may include a Hall effect sensor 444 placed at a target distance from the sensor magnet 442. The Hall effect sensor 444 may be configured to measure a change in magnetic field strength relative to a reference magnetic field strength. Such change may occur when the sensor magnet 442 rotates about the swivel joint 428, thereby changing a distance and an orientation of the sensor magnet 442 relative to the Hall effect sensor 444. In response, the Hall effect sensor 444 generates sensor signals representing an angular displacement of the linkage 422 about the swivel joint 428. These sensor signals may be interpreted by a microcontroller (e.g., the microcontroller 132 of FIG. 1E) to determine the positions of the pair of triggers 404, 406 along their respective trigger paths 430, 432.

Figure 5A:
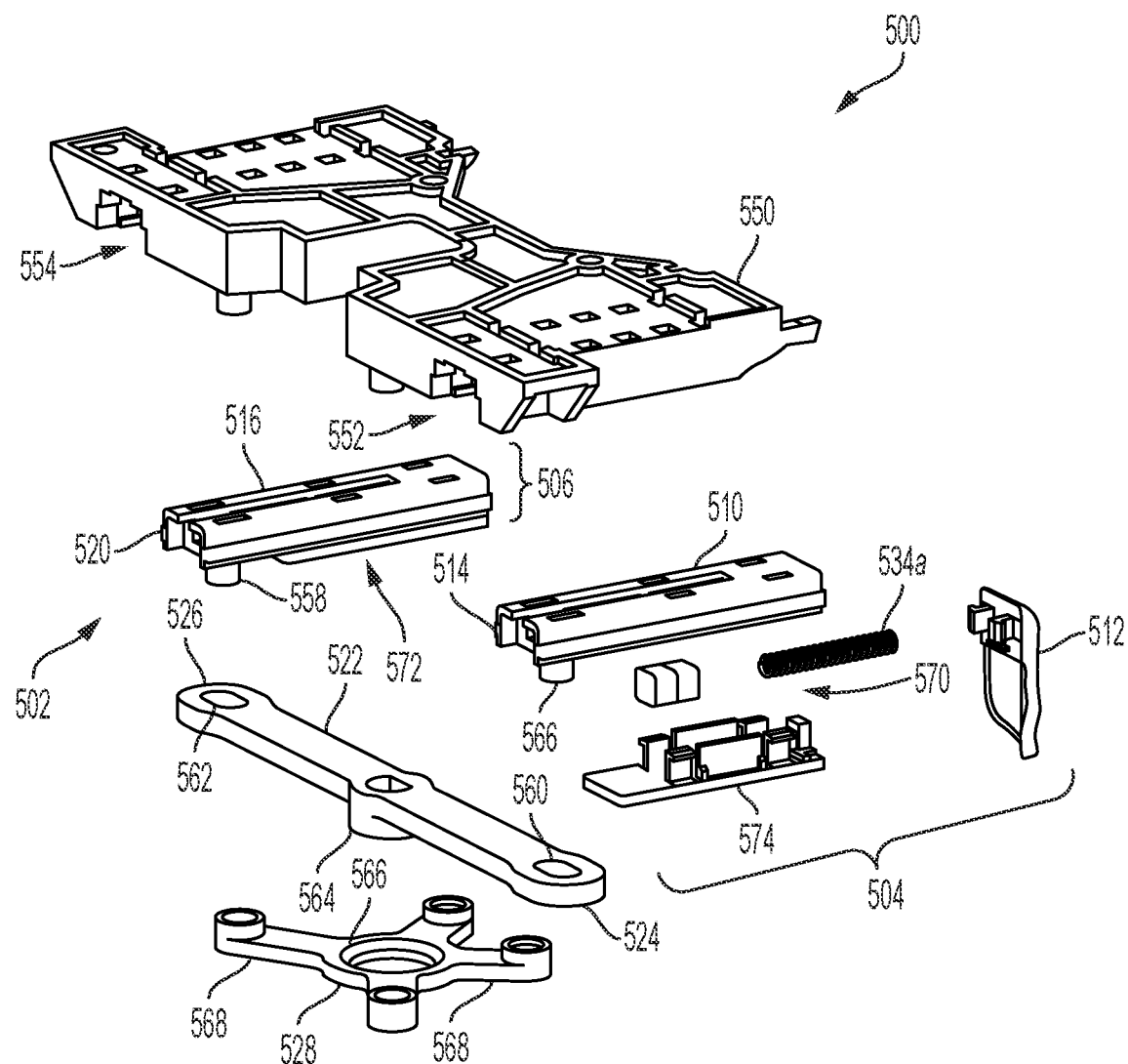
FIG. 5A is a schematic diagram, in exploded perspective view, of a portion of an example handheld controller device showing an example trigger assembly that includes a guide assembly.
Figure 5B:
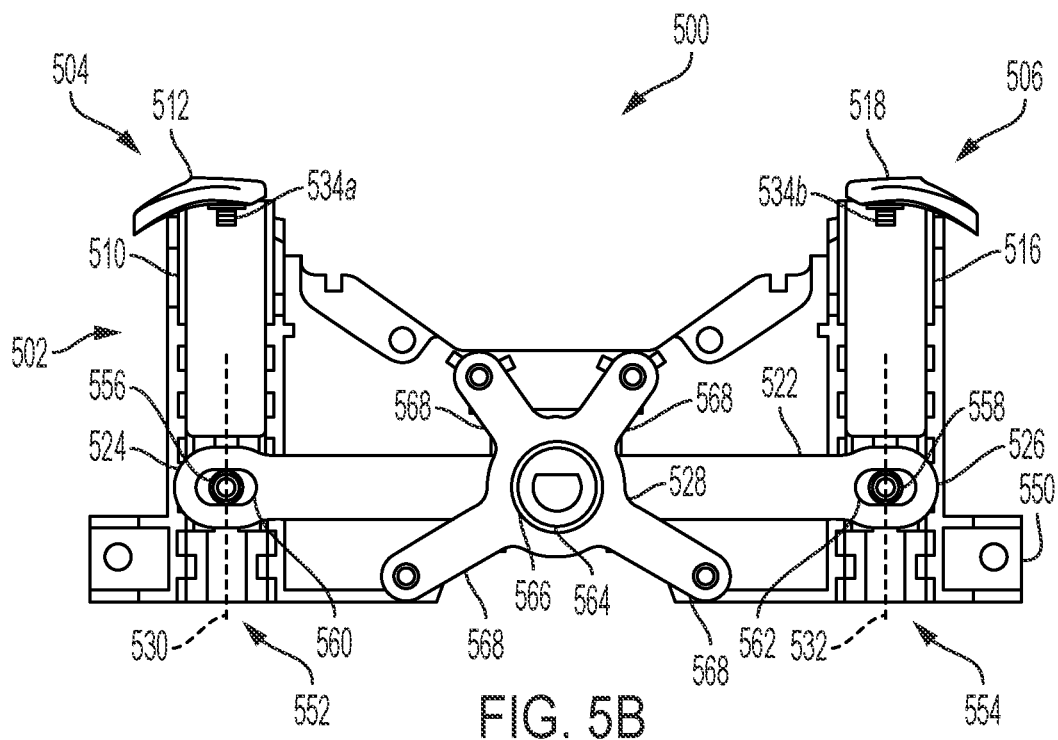
FIG. 5B is a schematic diagram, in bottom view, of the example trigger assembly of FIG. 5A.
Figure 5C:
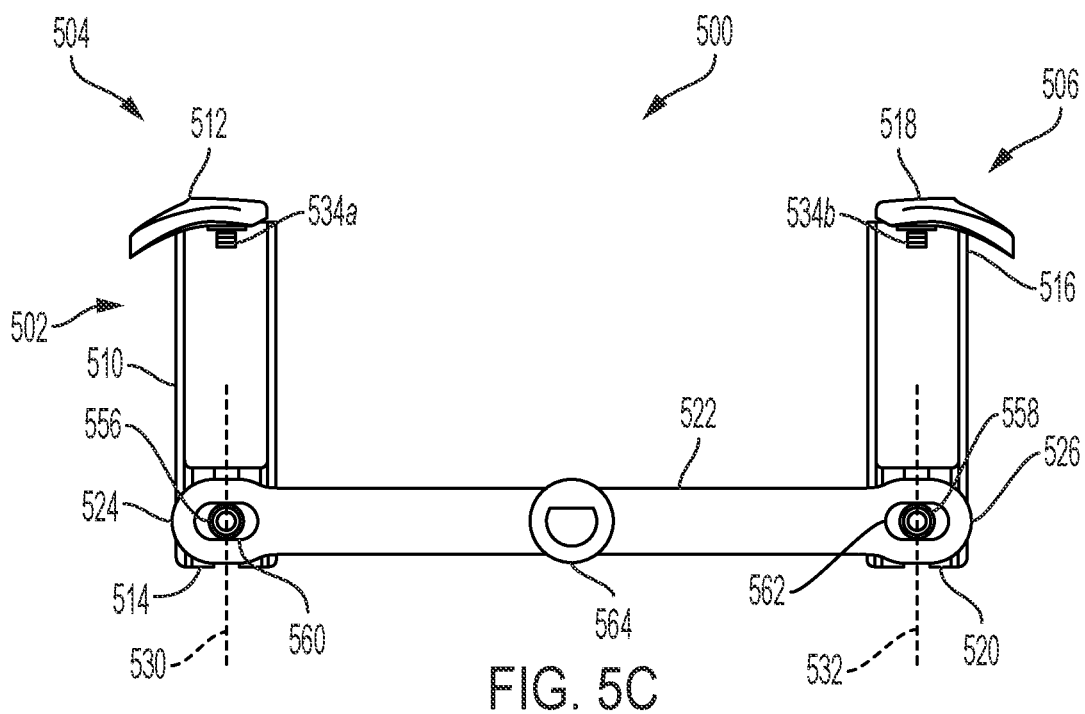
FIG. 5C is a schematic diagram, in bottom view, of the example trigger assembly of FIG. 5A, but in which the guide assembly and a swivel joint of the example trigger assembly have been omitted.

In some implementations, the trigger assembly described in relation to the example handheld controller device 100 of FIGS. 1A-1D may include other components for controlling the motion of the pair of triggers 116 along their respective trigger paths. For example, FIG. 5A presents a schematic diagram, in exploded perspective view, of a portion 500 of an example handheld controller device showing an example trigger assembly 502 that includes a guide assembly 550. FIG. 5B presents a schematic diagram, in bottom view, of the example trigger assembly 502 of FIG. 5A, but in which the example trigger assembly 502 is assembled. FIG. 5C shows the example trigger assembly 502 of FIG. 5B, but the guide assembly 550 and the swivel joint 528 have been omitted for purposes of clarity. Features analogous to FIGS. 5A-5C and 2A are related via coordinated numerals that differ in increment by three hundred.

The first and second triggers 504, 506 include, respectively, first and second trigger slides 510, 516 that each define at least part of a trigger arm. Moreover, the guide assembly 550 includes first and second channels 552, 554 that are configured to seat, respectively, the first and second trigger slides 510, 516. To do so, the guide assembly 550 may include surfaces that allow the first and second channels 552, 554 to mate with the first and second channels 552, 554. After assembly of the example trigger assembly 502, the first trigger slide 510 is contained within the first channel 552, which allows the first trigger slide 510 to move along the first trigger path 530. Similarly, the second trigger slide 516 is contained within the second channel 554, which allows the second trigger slide 516 to move along the second trigger path 532. As such, the first and second channels 552, 554 may function as captive channels for the first and second trigger slides 510, 516. In some variations, the first and second channels 552, 554 may define at least part of, respectively, the first and second trigger paths 530, 532. In further variations, such as shown in FIGS. 5A-5B, the first and second channels 552, 554 define, respectively, the first and second trigger paths 530, 532 in their entirety.

The first and second trigger ends 514, 520 may include, respectively, first and second pins 556, 558. These pins allow the first and second triggers 504, 506 to engage the linkage 522. For example, the first and second linkage ends 524, 526 may include, respectively, first and second slots 560, 562. The first slot 560 may be configured to receive the first pin 556 therein, thereby rotatably coupling the first linkage end 524 to the first trigger end 514. Similarly, the second slot 562 may be configured to receive the second pin 558 therein, thereby rotatably coupling the second linkage end 526 to the second trigger end 520. Thus, during operation, the first and second triggers 504, 506 may move linearly along their respective trigger paths 530, 532 while the linkage 522 rotates about the swivel joint 528. In some variations, such as shown in FIGS. 5A-5C, the linkage 522 includes a linkage pin 564 disposed at a center of the linkage 522. The linkage pin 564 is configured to seat in a hole 566 of the swivel joint 528, thereby allowing the linkage 522 to rotate about the swivel joint 528. In some variations, the swivel joint 528 includes a plurality of extensions 568 that are configured to couple to a housing, such as the housing 102 described in relation to the example handheld controller device 100 of FIGS. 1A-1D. In these variations, the swivel joint 528 may allow the example trigger assembly 502 to be pre-assembled into a single unit that can subsequently be coupled to the housing during final assembly.

In some implementations of the example trigger assembly 502, the biasing elements 534 are springs. For example, the guide assembly 550 may include first and second springs 534a, 534b. The first spring 534a may be disposed adjacent the first channel 552 and aligned along the first trigger path 530. Similarly, the second spring 534b may be disposed adjacent the second channel 554 and aligned along the second trigger path 532. The first and second springs 534a, 534b are configured to bias the first and second triggers 504, 506 towards first and second default positions, respectively.

In some variations, the first and second springs 534a, 534b are configured to be in compression when the first and second triggers 504, 506 are in, respectively, the first and second default positions. In some variations, such as shown in FIGS. 5A-5C, the first and second trigger slides 510, 516 may have, respectively, first and second pockets 570, 572 therein. The first pocket 570 is configured to contain the first spring 534a as the first trigger 504 moves along the first trigger path 530. Similarly, the second pocket 572 is configured to contain the second spring 534b as the second trigger 506 moves along the second trigger path 532.

Figure 5D:
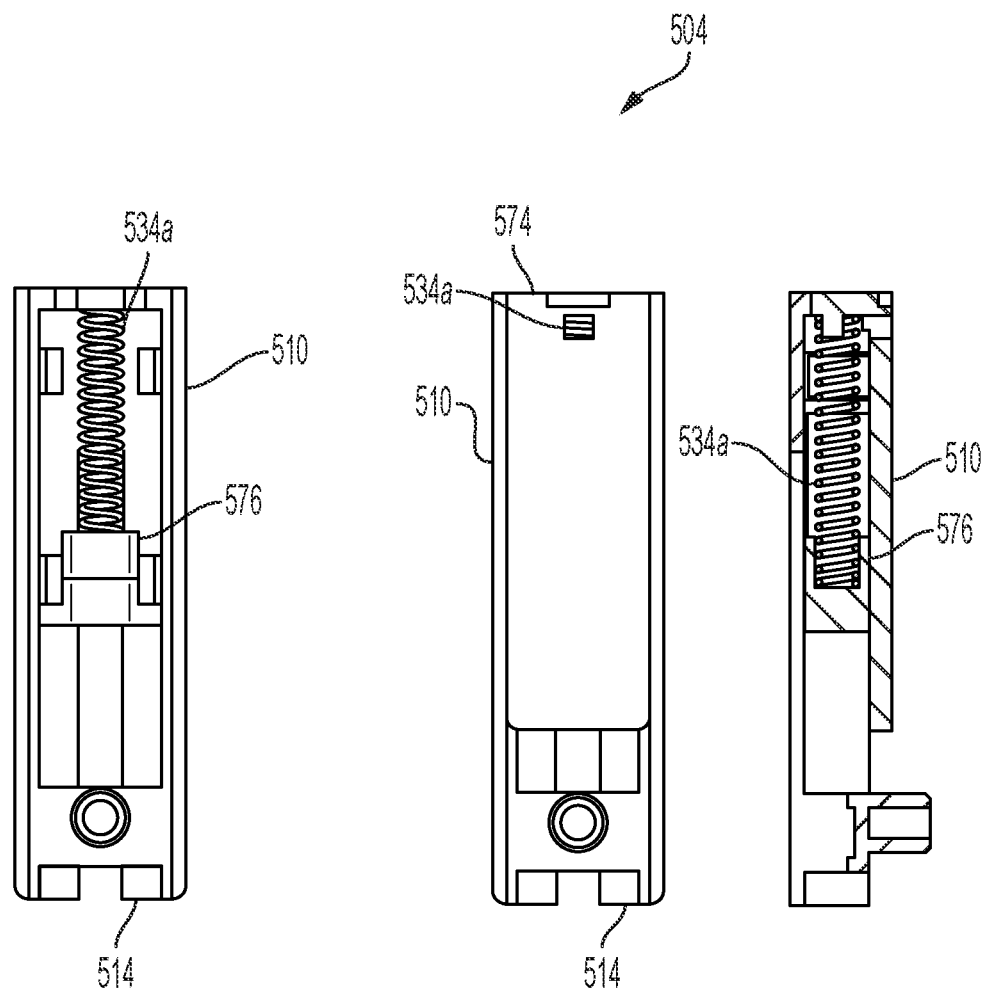
FIG. 5D is a schematic diagram, in bottom and cross-section views, of a trigger slide of the example trigger assembly of FIG. 5A.

FIG. 5D presents a schematic diagram, in bottom and cross-section views, of the first trigger slide 510 and the first pocket 570 therein. In the leftmost view of FIG. 5D, a cover plate 574 of the first trigger slide 510 has been omitted to allow the interior of the first pocket 570 to be shown. Although FIG. 5D depicts only the first trigger slide 510, the features depicted in FIG. 5D are also applicable to the second trigger slide 516 and the second pocket 572. The first pocket 570 contains the first spring 534a, which is held in place by a retention tab 576 within the first pocket 570. In this configuration, one end of the first spring 534a contacts the retention tab 576, which is fixed in position, while the other end of the first spring 534a contacts an interior surface of the first trigger slide 510, which is movable. The first spring 534a can thus resist the motion of the first trigger slide 510 as the first trigger 504 moves along the first trigger path 530 towards the guide assembly 550, thereby compressing the first spring 534a. In some variations, the retention tab 576 is disposed in the first pocket 570 to maintain the first spring 534a in compression when the first trigger 504 is in its default position.

Figure 6:
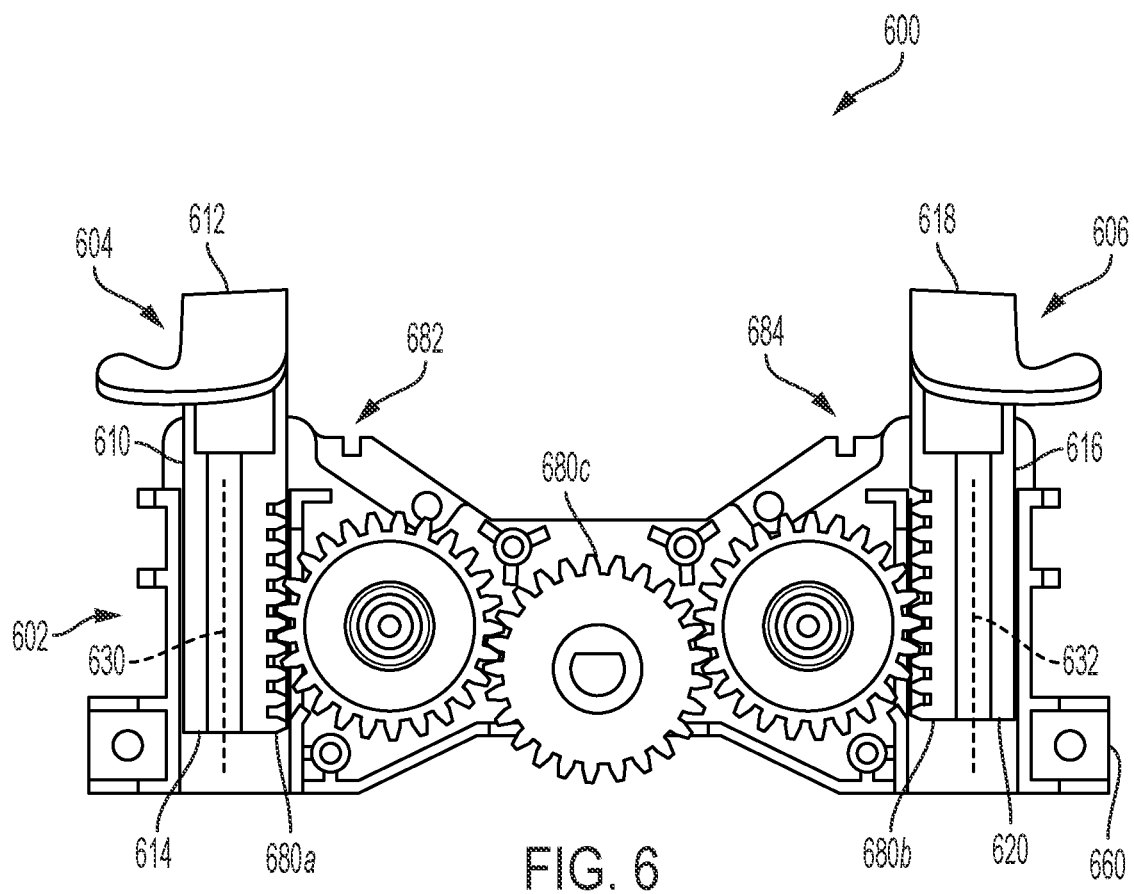
FIG. 6 is a schematic diagram, in top view, of a portion of an example handheld controller device showing an example trigger assembly that includes a plurality of gears.

In some implementations, the trigger assembly described in relation to the example handheld controller device 100 of FIGS. 1A-1D may include gears for controlling the motion of the pair of triggers 116 along their respective trigger paths. FIG. 6 presents a schematic diagram, in top view, of a portion 600 of an example handheld controller device showing an example trigger assembly 602 that includes a plurality of gears 680. Features analogous to both FIGS. 6 and 2A are related via coordinated numerals that differ in increment by four hundred. The plurality of gears 680 includes first and second linear gears 680a, 680b that are part of, respectively, the first and second trigger slides 610, 616. The plurality of gears 680 also includes first and second circular gears 680c, 680d that are adjacent, respectively, the first and second linear gears 680a, 680b. The pairs of adjacent gears 680—i.e., first adjacent pair 680a, 680c and second adjacent pair 680b, 680d—are configured to define, respectively, first and second "rack and pinion" actuators 682, 684. A central circular gear 680e mechanically couples the "rack and pinion" actuators 682, 684 to each other. To do so, the central circular gear 680e includes teeth that engage those of the first and second circular gears 680c, 680d. This engagement ensures that the first and second circular gears 680c, 680d rotate in the same angular direction during motion (e.g., both clockwise or both counterclockwise). Such a common rotation, however, causes the first and second linear gears 680a, 680b to move in opposite directions, thereby moving the first trigger 612 opposite that of the second trigger 618. For purposes of clarity, FIG. 6 does not depict the example trigger assembly 602 as having one or more biasing elements. However, the example trigger assembly 602 could include springs, such as described in relation to FIGS. 5A-5D. Other configurations of biasing elements are possible.

Figure 7A:
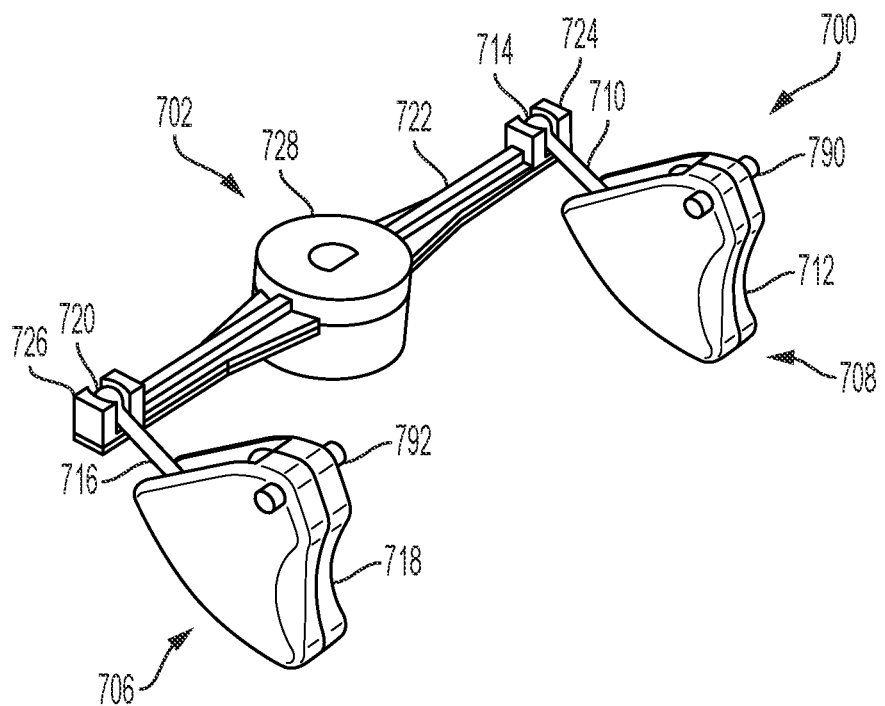
FIG. 7A is a schematic diagram, in perspective view, of a portion of an example handheld controller device showing an example trigger assembly that includes first and second pins for controlling a motion of, respectively, first and second triggers.
Figure 7B:
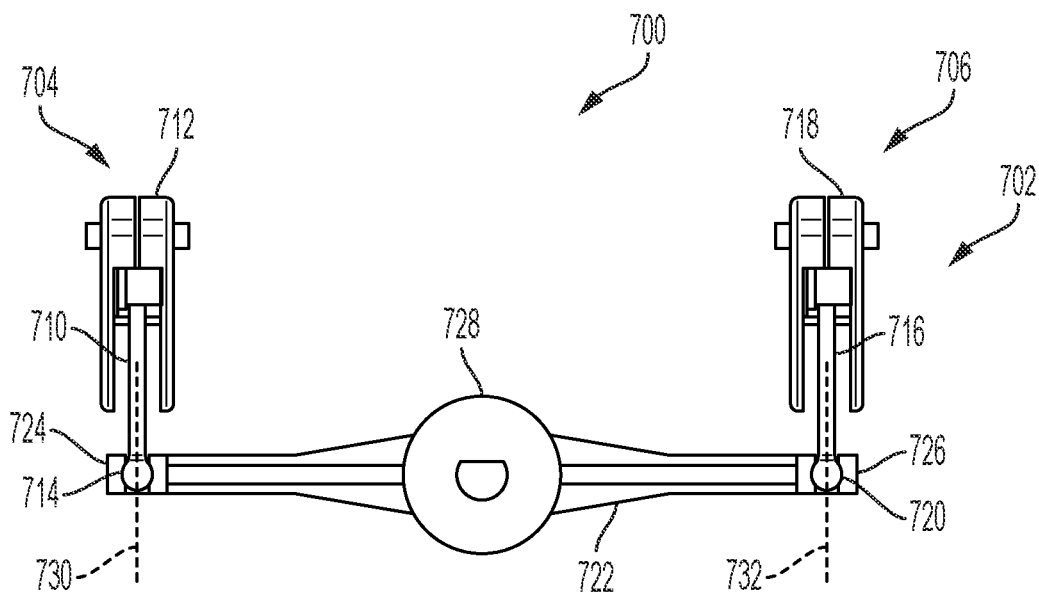
FIG. 7B is a schematic diagram, in top view, of the example trigger assembly of FIG. 7A.

In some implementations, the trigger assembly described in relation to the example handheld controller device 100 of FIGS. 1A-1D may include pins for controlling the motion of the pair of triggers 116 along their respective trigger paths. FIG. 7A presents a schematic diagram, in perspective view, of a portion 700 of an example handheld controller device showing an example trigger assembly 702 that includes first and second pins 790, 792 for controlling a motion of, respectively, first and second triggers 704, 706. FIG. 7B presents a schematic diagram, in top view, of the example trigger assembly 702 of FIG. 7A. Features analogous to FIGS. 7A-7B and 2A are related via coordinated numerals that differ in increment by four hundred. The first and second pins 790, 792 may be disposed through, respectively, the first and second trigger pads 712, 718 such that, when a pad is engaged (e.g., via a human hand), the motion of the pad includes a rotation about its pin. The rotation of first and second pins 790, 792 also displaces, respectively, the first and second trigger arms 710, 716, which are coupled to the linkage 722.

In some variations, such as shown in FIGS. 7A-7B, such coupling is facilitated by a ball and socket joint. For example, the first trigger end 714 of the first trigger 704 may terminate in a first ball that is configured to seat in a first spherical socket at the first linkage end 724 of the linkage 722. Similarly, the second trigger end 720 of the second trigger 706 may terminate in a second ball that is configured to seat in a second spherical socket at the second linkage end 726 of the linkage 722. In some variations, the first and second trigger arms 710, 716 may each be coupled to their respective trigger pads via a ball and socket joint (not shown). For purposes of clarity, FIGS. 7A-7B do not depict the example trigger assembly 702 as having one or more biasing elements. However, it will be understood that the example trigger assembly 702 may include biasing elements, such as described in relation to FIGS. 2A-2D and 3-4. Other configurations of biasing elements may be possible.

Although the example handheld controller devices described herein have been presented in the context of aircraft, the example handheld controller devices can be used to control the motion of other devices, such as watercraft (e.g., boats, jet skis, submarines, underwater drones, etc.) and land vehicles (e.g., automobiles, trucks, motorcycles, tanks, hovercraft, snowmobiles, etc.). The devices may be physical devices or simulated devices. To do so, the example handheld controller devices include a pair of triggers (e.g., the pair of triggers 116 described in relation to FIGS. 1A-1F) whose motion is used to generate control data for the device. The control data may represent a position or an orientation of a motion control surface or component of the device, such as a wing, an aileron, a fin, a plane (e.g., a dive plane, a sail plane, a stern plane, etc.), a rudder, a sail, a wheel, a track, a ski, a propulsion nozzle, and so forth.

The pair of triggers may be configured as counter-moving triggers that allow the example handheld controller device to alter a motion or an orientation of the device relative to an axis, especially between opposite directions along the axis. For example, the pair of triggers may control a motion of the device relative to a rotational axis, such as by alternating between clockwise and counterclockwise rotations about the rotation axis, including increasing or decreasing the angular velocity of such rotation. The pair of triggers may also control an orientation of the device relative to the rotational axis, such as by selectively iterating (e.g., clockwise or counterclockwise) between angular positions about the rotational axis. As another example, the pair of triggers may control a motion of the device along a linear axis, such as by alternating between "forward" and "backward" motion along the linear axis, including increasing or decreasing the linear velocity of such motion. The pair of triggers may also control an orientation of the device along the linear axis, such as by selectively iterating (e.g., "forward" or "backward") between various positions along the linear axis. Other types of motion or orientation are possible.

The example handheld controller devices may be part of a system, such as a control system of the device or a simulator system for simulating the device. In some implementations, the system includes a handheld controller device, such as those described in relation to FIGS. 1A-7B. For example, the handheld controller device may include a housing configured to be held in the hands of a user. The handheld controller device may also include a trigger assembly. The trigger assembly includes a pair of triggers that extend outward from a side of the handheld controller device and are configured to move along respective trigger paths. The trigger assembly also includes a guide assembly disposed inside the housing. The guide assembly includes, for each trigger, a channel that extends at least partially along the trigger path of the trigger. The channel is configured to seat a trigger slide of the trigger. The trigger assembly additionally includes a coupling assembly that is disposed inside the housing and connected to the pair of triggers. The coupling assembly is configured to transfer motion between the pair of triggers such that, when either of the triggers moves towards the housing along its trigger path, the coupling assembly moves the other trigger away (e.g., an equal distance away) from the housing along its respective trigger path.

In some implementations, the handheld controller device includes circuitry disposed in the housing. The circuitry includes one or more sensors that are configured to generate sensor signals based on positions of the pair of triggers along their respective trigger paths. The circuitry also includes a microcontroller that is configured to receive the sensor signals and, in response, generate control data for a device. In some implementations, the system includes one or more computer processors that are configured to perform operations that include receiving the control data from the handheld controller device. The operations also include controlling the device based on the control data.

In some implementations, the system is a simulator system and the device is a simulated device. For example, the system may include a console that comprises the one or more computer processors. The system may also include one or more communication channels between the handheld controller device and the console. The one or more communication channels may include a wired communication link between the handheld controller device and the console. The one or more communication channels may also include a wireless communication link between the handheld controller device and the console.

In some implementations, the device is an aircraft, and the control data is aircraft control data. In these implementations, controlling the device includes altering, in response to the aircraft control data, a position or an orientation of a motion control surface of the aircraft. Altering a position or an orientation of a motion control surface may, for example, include controlling a yaw, a pitch, or a roll of the aircraft. In other implementations, the device is a watercraft, and the control data is watercraft control data. In such implementations, controlling the device includes altering, in response to the watercraft control data, a position or an orientation of a motion control surface of the watercraft. Examples of the motion control surface include a fin, a plane (e.g., a dive plane, a sail plane, a stern plane, etc.), a rudder, a sail, or a propulsion nozzle. In yet other implementations, the device is a land vehicle, and the control data is land vehicle control data. In these implementations, controlling the device includes altering, in response to the land vehicle control data, a position of a wheel or a track of the land vehicle. This operation may also include altering, in response to the land vehicle control data, a rotational direction of the wheel or the track of the land vehicle.

In some implementations, the housing includes a wall having a hole therethrough. In this configuration, the handheld controller device may include a slider assembly having a shaft disposed through the hole and configured to move along a slider path. Moreover, the circuitry includes a second sensor that is configured to generate second sensor signals based on a position of the slider assembly, and the microcontroller is further configured to receive the second sensor signals and, in response, generate second control data for the device. In these implementations, the operations include receiving the second control data from the handheld controller device. The operations also include controlling an operation characteristic of the device based on the second control data.

The slider assembly may be useful in controlling a flight control parameter of an aircraft. For example, the device may be an aircraft, the control data may be aircraft control data, and the second control data may be second aircraft control data. In these cases, controlling the device includes altering, in response to the aircraft control data, a position or an orientation of a motion control surface of the aircraft. Moreover, controlling an operation characteristic of the device includes altering, in response to the second aircraft control data, the flight control parameter of the aircraft. The flight control parameter may represent the operational characteristic of the aircraft. Moreover, the flight control parameter may control a throttle for an engine of the aircraft, an air-to-fuel mixture for an engine of the aircraft, an angle of attack for propeller blades of the aircraft, the angle of attack influencing a rotational speed of the propeller blades, or any combination thereof. Other flight control parameters are possible.

The example handheld controller devices may also be a part of a control method. In some implementations, the control method includes generating sensor signals based on positions of a pair of triggers on a handheld controller device, such as those described in relation to FIGS. 1A-7B. For example, the handheld controller device may include a housing configured to be held in the hands of a user. The handheld controller device may also include a trigger assembly. The trigger assembly includes pair of triggers that extend outward from a side of the handheld controller device and are configured to move along respective trigger paths. The trigger assembly also includes a guide assembly disposed inside the housing. The guide assembly includes, for each trigger, a channel that extends at least partially along the trigger path of the trigger. The channel is configured to seat a trigger slide of the trigger. The trigger assembly additionally includes a coupling assembly that is disposed inside the housing and connected to the pair of triggers. The coupling assembly is configured to transfer motion between the pair of triggers such that, when either of the triggers moves towards the housing along its trigger path, the coupling assembly moves the other trigger away (e.g., an equal distance away) from the housing along its respective trigger path. In these implementations, the control method also includes generating control data in response to the sensor signals and communicating the control data from the handheld controller device.

In some implementations, communicating the control data includes communicating the control data to a component of a simulator system. In these implementations, the method includes, by operation of one or more computer processors of the simulator system, controlling one or both of a position and an orientation of a simulated device in response to the control data. In some instances, the simulated device is a simulated aircraft, the control data is aircraft control data. In these instances, controlling one or both of a position and an orientation includes controlling a yaw, a pitch, or a roll in a motion simulation (e.g., a flight simulation) of the simulated aircraft in response to the aircraft control data. In some instances, the simulated device is a simulated watercraft, and the control data is watercraft control data. In such instances, controlling one or both of a position and an orientation includes controlling a yaw, a pitch, or a roll in a motion simulation (e.g., a sailing simulation) of the simulated watercraft in response to the watercraft control data. In some instances, the simulated device is a simulated land vehicle, and the control data is land vehicle control data. In these instances, controlling one or both of a position and an orientation includes controlling a yaw, a pitch, or a roll in a motion simulation (e.g., a driving simulation) of the simulated land vehicle in response to the land vehicle control data.

In some implementations, communicating the control data includes communicating the control data to a physical device. In such implementations, the method includes, by operation of one or more computer processors in a control system of the physical device, controlling one or both of a position and an orientation of the physical device in response to the control data. In some instances, the physical device is a flyable aircraft, and the control data is aircraft control data. In these instances, controlling one or both of a position and an orientation includes controlling a yaw, a pitch, or a roll of the flyable aircraft in response to the aircraft control data. In some instances, the physical device is a sailable watercraft, and the control data is watercraft control data. In such instances, controlling one or both of a position and an orientation includes controlling a yaw, a pitch, or a roll of the sailable watercraft in response to the watercraft control data. In some instances, the physical device is a drivable land vehicle, and the control data is land vehicle control data. In these instances, controlling one or both of a position and an orientation includes controlling a yaw, a pitch, or a roll of the drivable land vehicle in response to the land vehicle control data.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, e.g., one or more modules of computer program instructions, encoded on a computer storage medium for execution by, or to control the operation of, a computing device. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a computing device on data stored on one or more computer-readable storage devices or received from other sources.

The term "computing device" (or "data processing apparatus") encompasses all kinds of apparatus, devices, and machines for processing data, including by way of example a programmable processor, a computer, a system on a chip, or multiple ones, or combinations, of the foregoing. The computing device can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer (or computing device) or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In some aspects of what is described, a handheld controller device may be described by the following examples:

Example 1

A handheld controller device, comprising:
a housing configured to be held in the hands of a user;
a trigger assembly comprising:
   a pair of triggers extending outward from a side of the handheld controller device, the pair triggers being configured to move along respective trigger paths, and
   a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path; and
circuitry disposed in the housing and comprising:
   one or more sensors configured to generate sensor signals based on positions of the pair of triggers along their respective trigger paths, and
   a microcontroller configured to receive the sensor signals and, in response, generate aircraft control data.

Example 2

The handheld controller device of example 1,
wherein the housing comprises a wall that defines the side and has first and second openings therethrough;
wherein the pair of triggers comprises:
   a first trigger having a first trigger arm extending from a first trigger pad into the first opening and terminating in a first trigger end, and
   a second trigger having a second trigger arm extending from a second trigger pad into the second opening and terminating in a second trigger end; and
wherein the coupling assembly comprises:
   a linkage disposed in the housing and extending between first and second linkage ends, the first and second linkage ends rotatably coupled to, respectively, the first and second trigger ends, and
   a swivel joint coupling the linkage to the housing and connected to the linkage between the first and second linkage ends.

Example 3

The handheld controller device of example 2, wherein the one or more sensors comprises a sensor configured to generate the sensor signals based on one or both of a position or an orientation of the linkage.

Example 4

The handheld controller device of example 1 or any one of examples 2-3,
wherein the pair of triggers comprises:
a first trigger having a first trigger path and a first default position thereon, and
a second trigger having a second trigger path and a second default position thereon; and
wherein the trigger assembly comprises one or more biasing elements in the housing configured to bias the first and second triggers towards the first and second default positions, respectively.

Example 5

The handheld controller device of example 4, wherein the first and second default positions are midway along the first and second trigger paths, respectively.

Example 6

The handheld controller device of example 4 or example 5, wherein the one or more biasing elements comprises one or more springs.

Example 7

The handheld controller device of example 4 or any one of examples 5-6, wherein the one or more biasing elements comprises one or more magnets.

Example 8

The handheld controller device of example 1 or any one of examples 2-7,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly; and
wherein the microcontroller is further configured to receive the second sensor signals and, in response, generate second aircraft control data.

Example 9

The handheld controller device of example 8, wherein the slider assembly comprises a knob connected to the shaft outside the housing.

Example 10

The handheld controller device of example 1 or any one of examples 2-9, wherein the one or more sensors comprises a rotary potentiometer.

Example 11

The handheld controller device of example 1 or any one of examples 2-10, wherein the one or more sensors comprises a Hall effect sensor.

Example 12

The handheld controller device of example 1 or any one of examples 2-11, wherein the circuitry comprises communication circuitry defining one or both of a wired communication interface and a wireless communication interface.

Example 13

The handheld controller device of example 1 or any one of examples 2-12,
wherein the microcontroller is configured to generate the aircraft control data for a flight simulator system;
wherein the circuitry comprises communication circuitry defining one or both of a wired communication interface and a wireless communication interface; and
wherein the communication circuitry is configured to communicate the aircraft control data from the handheld controller device to a component of the flight simulator system.

Example 14

The handheld controller device of example 1 or any one of examples 2-13,
wherein the microcontroller is configured to generate the aircraft control data for a remotely-controlled flyable aircraft;
wherein the circuitry comprises communication circuitry defining one or both of a wired communication interface and a wireless communication interface; and
wherein the communication circuitry is configured to communicate the aircraft control data from the handheld controller device to a component of the remotely-controlled flyable aircraft.

In some aspects of what is described, a flight simulation system may be described by the following examples:

Example 15

A flight simulator system, comprising:
a handheld controller device comprising:
a housing configured to be held in the hands of a user,
a trigger assembly comprising:
a pair of triggers extending outward from a side of the handheld controller device, the pair of triggers being configured to move along respective trigger paths, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away (e.g., an equal distance away) from the housing along its respective trigger path, and
circuitry disposed in the housing and comprising:
one or more sensors configured to generate sensor signals based on positions of the pair of triggers along their respective trigger paths, and a microcontroller configured to receive the sensor signals and, in response, generate aircraft control data for a simulated aircraft; and
one or more computer processors configured to perform operations comprising:
receiving the aircraft control data from the handheld controller device, and
altering, in response to the aircraft control data, a position of one or more flight control surfaces of the simulated aircraft.

Example 16

The flight simulator system of example 15, wherein altering a position of the one or more flight control surfaces comprises controlling a yaw of the simulated aircraft.

Example 17

The flight simulator system of example 15 or example 16,
wherein the one or more flight control surfaces comprise surfaces defined by a rudder of the simulated aircraft; and
wherein altering a position of the one or more flight control surfaces comprises altering a position of the rudder.

Example 18

The flight simulator system of example 15 or example 16,
wherein the one or more flight control surfaces comprise surfaces defined by a tail rotor blade of the simulated aircraft; and
wherein altering a position of the one or more flight control surfaces comprises altering a blade pitch of the tail rotor blade.

Example 19

The flight simulator system of example 15, wherein altering a position of the one or more flight control surfaces comprises controlling a pitch of the simulated aircraft.

Example 20

The flight simulator system of example 15 or example 19,
wherein the one or more flight control surfaces comprise surfaces defined by an elevator of the simulated aircraft; and
wherein altering a position of the one or more flight control surfaces comprises altering a position of the elevator.

Example 21

The flight simulator system of example 15, wherein altering a position of the one or more flight control surfaces comprises controlling a roll of the simulated aircraft.

Example 22

The flight simulator system of example 15 or example 21,
wherein the one or more flight control surfaces comprise surfaces defined by an aileron of the simulated aircraft; and
wherein altering a position of the one or more flight control surfaces comprises altering a position of the aileron.

Example 23

The flight simulator system of example 15 or any one of examples 16-22,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second aircraft control data for the simulated aircraft; and
wherein the operations comprise:
receiving the second aircraft control data from the handheld controller device, and
altering, in response to the second aircraft control data, a flight control parameter of the simulated aircraft, the flight control parameter representing an operational characteristic of the simulated aircraft.

Example 24

The flight simulator system of example 23, wherein flight control parameter controls a throttle for an engine of the simulated aircraft.

Example 25

The flight simulator system of example 23, wherein flight control parameter controls an air-to-fuel mixture for an engine of the simulated aircraft.

Example 26

The flight simulator system of example 23, wherein flight control parameter controls an angle of attack for propeller blades of the simulated aircraft, the angle of attack influencing a rotational speed of the propeller blades.

Example 27

The flight simulator system of example 15 or any one of examples 16-26, comprising:
a console comprising the one or more computer processors; and
one or more communication channels between the handheld controller device and the console.

Example 28

The flight simulator system of example 27, wherein the one or more communication channels comprise a wired communication link between the handheld controller device and the console.

Example 29

The flight simulator system of example 27 or example 28, wherein the one or more communication channels comprise a wireless communication link between the handheld controller device and the console.

Example 30

The flight simulator system of example 15 or any one of examples 16-29, wherein the operations comprise:
  generating graphical data based on the position of the one or more flight control surfaces, the graphical data representing a position and an orientation of the simulated aircraft in a simulated environment.

Example 31

The flight simulator system of example 30, wherein generating graphical data comprises:
  generating graphical data in response to the altered position of the one or more flight control surfaces.

Example 32

The flight simulator system of example 30 or example 31, comprising:
  a presentation device in communication with a computing device comprising the one or more computer processors, the presentation device configured to display an image in response to receiving display signals from the computing device;
  wherein the operations comprise:
    sending display signals to the presentation device based on the graphical data.

In some aspects of what is described, a remote control system may be described by the following examples:

Example 33

A remote control system, comprising:
  a handheld controller device comprising:
    a housing configured to be held in the hands of a user,
    a trigger assembly comprising:
      a pair of triggers extending outward from a side of the handheld controller device, the pair of triggers being configured to move along respective trigger paths, and
      a coupling assembly disposed inside the housing and connected to the pair of triggers, the coupling assembly configured to transfer motion between the pair of triggers such that, when either of the triggers moves towards the housing along its trigger path, the coupling assembly moves the other trigger away (e.g., an equal distance away) from the housing along its respective trigger path, and
    circuitry disposed in the housing and comprising:
      one or more sensors configured to generate sensor signals based on positions of the pair of triggers along their respective trigger paths, and
      a microcontroller configured to receive the sensor signals and, in response, generate aircraft control data; and
  a control system of the remotely controlled flyable aircraft comprising one or more computer processors, the one or more computer processors configured to perform operations comprising:
    receiving the aircraft control data from the handheld controller device, and
    altering, in response to the aircraft control data, a position of one or more flight control surfaces of the remotely controlled flyable aircraft.

Example 34

The remote control system of example 33,
  wherein the one or more flight control surfaces comprises surfaces defined by a moveable body of remotely controlled flyable aircraft;
  wherein the control system comprises an actuator subsystem in communication with the one or more computer processors and configured to move the moveable body in response to motion signals received from the control system;
  wherein the operations comprise:
    generating, by operation of the one or more computer processors, motion signals based on the aircraft control data from the handheld controller device; and
  wherein altering the position of the one or more flight control surfaces comprises:
    sending the motion signals to the actuator subsystem to alter a position of the moveable body.

Example 35

The remote control system of example 34, wherein the moveable body is a rudder of the remotely controlled flyable aircraft.

Example 36

The remote control system of example 34, wherein the moveable body is a tail rotor blade of the remotely controlled flyable aircraft and the position is a blade pitch.

Example 37

The remote control system of example 34, wherein the moveable body is an elevator of the remotely controlled flyable aircraft.

Example 38

The remote control system of example 34, wherein the moveable body is an aileron of the remotely controlled flyable aircraft.

Example 39

The remote control system of example 33 or any one of examples 34-36, wherein altering a position of the one or more flight control surfaces comprises controlling a yaw of the remotely controlled flyable aircraft.

Example 40

The remote control system of example 33 or any one of examples 34 or 37, wherein altering a position of the one or more flight control surfaces comprises controlling a pitch of the remotely controlled flyable aircraft.

Example 41

The remote control system of example 33 or any one of examples 34 or 38, wherein altering a position of the one or more flight control surfaces comprises controlling a roll of the remotely controlled flyable aircraft.

Example 42

The remote control system of example 33 or any one of examples 34-41,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second aircraft control data for the remotely controlled flyable aircraft; and
wherein the operations comprise:
receiving the second aircraft control data from the handheld controller device, and
altering, in response to the second aircraft control data, a flight control parameter of the remotely controlled flyable aircraft, the flight control parameter representing an operational characteristic of the remotely controlled flyable aircraft.

Example 43

The remote control system of example 42, wherein flight control parameter controls a throttle for an engine of the remotely controlled flyable aircraft.

Example 44

The remote control system of example 42, wherein flight control parameter controls an air-to-fuel mixture for an engine of the remotely controlled flyable aircraft.

Example 45

The remote control system of example 42, wherein flight control parameter controls an angle of attack for propeller blades of the remotely controlled flyable aircraft, the angle of attack influencing a rotational speed of the aircraft propeller blades.

Example 46

The remote control system of example 33 or any one of examples 34-35, comprising one or more communication channels between the handheld controller device and the control system of the remotely controlled flyable aircraft.

Example 47

The remote control system of example 46, wherein the one or more communication channels comprise a wired communication link between the handheld controller device and the control system.

Example 48

The remote control system of example 46 or example 47, wherein the one or more communication channels comprise a wireless communication link between the handheld controller device and the control system.

Example 49

The remote control system of example 33 or any one of examples 34-48, wherein the remotely controlled flyable aircraft is an unmanned aerial vehicle (UAV) or a drone.

In some aspects of what is described, a flight control method may be described by the following examples:

Example 47

A flight control method, comprising:
generating sensor signals based on positions of a pair of triggers on a handheld controller device, the handheld controller device comprising:
a housing configured to be held in the hands of a user, and
a trigger assembly comprising:
the pair of triggers, extending outward from a side of the handheld controller device and configured to move along respective trigger paths, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away (e.g., an equal distance away from the housing along its respective trigger path;
generating aircraft control data in response to the sensor signals; and
communicating the aircraft control data from the handheld controller device.

Example 48

The flight control method of example 47,
wherein communicating the aircraft control data comprises communicating the aircraft control data to a component of a flight simulator system; and
wherein the method comprises:
by operation of one or more computer processors of the flight simulator system, controlling a direction of a simulated aircraft in a flight simulation in response to the aircraft control data.

Example 49

The flight control method of example 48, wherein controlling a direction comprises controlling a yaw of the simulated aircraft.

Example 50

The flight control method of example 48, wherein controlling a direction comprises controlling a pitch of the simulated aircraft.

Example 51

The flight control method of example 48, wherein controlling a direction comprises controlling a roll of the simulated aircraft.

Example 52. The flight control method of example 47, wherein communicating the aircraft control data comprises communicating the aircraft control data to a remotely controlled flyable aircraft; and
wherein the method comprises:
by operation of one or more computer processors in a control system of the remotely controlled flyable aircraft, controlling a direction of the remotely controlled flyable aircraft in response to the aircraft control data.

Example 53

The flight control method of example 48, wherein controlling a direction comprises controlling a yaw of the remotely controlled flyable aircraft.

Example 54

The flight control method of example 48, wherein controlling a direction comprises controlling a pitch of the remotely controlled flyable aircraft.

Example 55

The flight control method of example 48, wherein controlling a direction comprises controlling a roll of the remotely controlled flyable aircraft.

Example 56

The flight control method of example 47 or any one of examples 48-55,
wherein the coupling assembly comprises a linkage disposed in the housing and coupled to the pair of triggers, and
wherein generating sensor signals comprises sensing one or both of a position and an orientation of the linkage.
In some aspects of what is described, a handheld controller device may be described by the following examples:

Example 57

A handheld controller device comprising:
a housing configured to be held in the hands of a user;
a trigger assembly comprising:
a pair of triggers extending outward from a side of the handheld controller device and configured to move along respective trigger paths, each trigger comprising a trigger slide and a trigger pad, the trigger pad disposed outside of the housing and adjacent the side;
a guide assembly disposed inside the housing and comprising, for each trigger, a channel that extends at least partially along the trigger path of the trigger, the channel configured to seat the trigger slide of the trigger, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path;
circuitry disposed in the housing and comprising:
one or more sensors configured to generate sensor signals based on positions of the pair of triggers along their respective trigger paths, and
a microcontroller configured to receive the sensor signals and, in response, generate control data; and
a communication interface configured to communicate the control data from the handheld controller device.

Example 58

The handheld controller device of example 57,
wherein the housing comprises a wall that defines the side and has first and second openings therethrough;
wherein the pair of triggers comprises:
a first trigger having a first trigger slide and a first trigger pad, the first trigger slide extending from a first trigger pad into the first opening and terminating in a first trigger end, and
a second trigger having a second trigger slide and a second trigger pad, the second trigger slide extending from a second trigger pad into the second opening and terminating in a second trigger end; and
wherein the coupling assembly comprises:
a linkage disposed in the housing and extending between first and second linkage ends, the first and second linkage ends rotatably coupled to, respectively, the first and second trigger ends, and
a swivel joint coupling the linkage to the housing and connected to the linkage between the first and second linkage ends.

Example 59

The handheld controller device of example 58,
wherein the first and second trigger ends comprise, respectively, first and second pins;
wherein the first linkage end comprises a first slot configured to receive the first pin therein, thereby rotatably coupling the first linkage end to the first trigger end;
wherein the second linkage end comprises a second slot configured to receive the second pin therein, thereby rotatably coupling the second linkage end to the second trigger end.

Example 60

The handheld controller device of example 57 or any one of examples 58-59,
wherein the pair of triggers comprises:
a first trigger having a first trigger path and a first default position thereon, and
a second trigger having a second trigger path and a second default position thereon; and
wherein the guide assembly comprises:
first and second channels configured to seat the trigger slides of, respectively, the first and second triggers,
a first spring disposed adjacent the first channel and aligned along the first trigger path, and
a second spring disposed adjacent the second channel and aligned along the second trigger path,
wherein the first and second springs are configured to bias the first and second triggers towards the first and second default positions, respectively.

Example 61

The handheld controller device of example 60, wherein the first and second default positions are midway along the first and second trigger paths, respectively.

Example 62

The handheld controller device of example 60 or example 61,
wherein the first trigger comprises a first trigger slide having a first pocket therein, the first pocket configured to contain the first spring as the first trigger moves along the first trigger path; and
wherein the second trigger comprises a second trigger slide having a second pocket therein, the second pocket configured to contain the second spring as the second trigger moves along the second trigger path.

Example 63

The handheld controller device of example 60 or any one of examples 61-62,
wherein the first and second springs are configured to be in compression when the first and second triggers are in, respectively, the first and second default positions.

Example 64

The handheld controller device of example 57 or any one of examples 58-63,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly; and
wherein the microcontroller is further configured to receive the second sensor signals and, in response, generate second control data.

In some aspects of what is described, a system may be described by the following examples:

Example 65

A system, comprising:
a handheld controller device comprising:
a housing configured to be held in the hands of a user,
a trigger assembly comprising:
a pair of triggers extending outward from a side of the handheld controller device, the pair of triggers being configured to move along respective trigger paths,
a guide assembly disposed inside the housing and comprising, for each trigger, a channel that extends at least partially along the trigger path of the trigger, the channel configured to seat a trigger slide of the trigger, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path, and
circuitry disposed in the housing and comprising:
one or more sensors configured to generate sensor signals based on positions of the pair of triggers along their respective trigger paths, and
a microcontroller configured to receive the sensor signals and, in response, generate control data for a device; and
one or more computer processors configured to perform operations comprising:
receiving the control data from the handheld controller device, and
controlling the device based on the control data.

Example 66

The system of example 65, wherein the system is a simulator system and the device is a simulated device.

Example 67

The system of example 66, comprising:
a console comprising the one or more computer processors; and
one or more communication channels between the handheld controller device and the console.

Example 68

The system of example 67, wherein the one or more communication channels comprise a wired communication link between the handheld controller device and the console.

Example 69

The system of example 67 or example 68, wherein the one or more communication channels comprise a wireless communication link between the handheld controller device and the console.

Example 70

The system of example 65 or any one of examples 66-69,
wherein the device is an aircraft, and the control data is aircraft control data; and
wherein controlling the device comprises altering, in response to the aircraft control data, a position or an orientation of a motion control surface of the aircraft.

Example 71

The system of example 70, wherein altering a position or an orientation of a motion control surface comprises controlling a yaw, a pitch, or a roll of the aircraft.

Example 72

The system of example 65 or any one of examples 66-69,
wherein the device is a watercraft, and the control data is watercraft control data; and
wherein controlling the device comprises altering, in response to the watercraft control data, a position or an orientation of a motion control surface of the watercraft.

Example 73

The system of example 65 or any one of examples 66-69,
wherein the device is a land vehicle, and the control data is land vehicle control data; and wherein controlling the device comprises altering, in response to the land vehicle control data, one or both of:
a position of a wheel or a track of the land vehicle, and
a rotational direction of the wheel or the track of the land vehicle.

Example 74

The system of example 65 or any one of examples 66-73,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second control data for the device; and
wherein the operations comprise:
receiving the second control data from the handheld controller device, and
controlling an operation characteristic of the device based on the second control data.

Example 75

The system of example 74 (but excluding examples 72-73),
wherein the device is an aircraft, the control data is aircraft control data, and the second control data is second aircraft control data;
wherein controlling the device comprises altering, in response to the aircraft control data, a position or an orientation of a motion control surface of the aircraft; and
wherein controlling an operation characteristic of the device comprises altering, in response to the second aircraft control data, a flight control parameter of the aircraft, the flight control parameter representing the operational characteristic of the aircraft.

Example 76

The system of example 75, wherein flight control parameter controls:
a throttle for an engine of the aircraft;
an air-to-fuel mixture for an engine of the aircraft; or
an angle of attack for propeller blades of the aircraft, the angle of attack influencing a rotational speed of the propeller blades.

In some aspects of what is described, a control method may be described by the following examples:

Example 77

A control method, comprising:
generating sensor signals based on positions of a pair of triggers on a handheld controller device, the handheld controller device comprising:
a housing configured to be held in the hands of a user, and
a trigger assembly comprising:
the pair of triggers, extending outward from a side of the handheld controller device and configured to move along respective trigger paths,
a guide assembly disposed inside the housing and comprising, for each trigger, a channel that extends at least partially along the trigger path of the trigger, the channel configured to seat a trigger slide of the trigger, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path;
generating control data in response to the sensor signals; and
communicating the control data from the handheld controller device.

Example 78

The control method of example 77,
wherein communicating the control data comprises communicating the control data to a component of a simulator system; and
wherein the method comprises:
by operation of one or more computer processors of the simulator system, controlling one or both of a position and an orientation of a simulated device in response to the control data.

Example 79

The control method of example 78,
wherein the simulated device is a simulated aircraft, and the control data is aircraft control data; and
wherein controlling one or both of a position and an orientation comprises controlling a yaw, a pitch, or a roll in a motion simulation (e.g., a flight simulation) of the simulated aircraft in response to the aircraft control data.

Example 80

The control method of example 78,
wherein the simulated device is a simulated watercraft, and the control data is watercraft control data; and
wherein controlling one or both of a position and an orientation comprises controlling a yaw, a pitch, or a roll in a motion simulation (e.g., a sailing simulation) of the simulated watercraft in response to the watercraft control data.

Example 81

The control method of example 78,
wherein the simulated device is a simulated land vehicle, and the control data is land vehicle control data; and
wherein controlling one or both of a position and an orientation comprises controlling a yaw, a pitch, or a roll in a motion simulation (e.g., a driving simulation) of the simulated land vehicle in response to the land vehicle control data.

Example 82

The control method of example 77,
wherein communicating the control data comprises communicating the control data to a physical device; and
wherein the method comprises:
  by operation of one or more computer processors in a control system of the physical device, controlling one or both of a position and an orientation of the physical device in response to the control data.

Example 83

The control method of example 82,
wherein the physical device is a flyable aircraft, and the control data is aircraft control data; and
wherein controlling one or both of a position and an orientation comprises controlling a yaw, a pitch, or a roll of the flyable aircraft in response to the aircraft control data.

Example 84

The control method of example 82,
wherein the physical device is a sailable watercraft, and the control data is watercraft control data; and
wherein controlling one or both of a position and an orientation comprises controlling a yaw, a pitch, or a roll of the sailable watercraft in response to the watercraft control data.

Example 85

The control method of example 82,
wherein the physical device is a drivable land vehicle, and the control data is land vehicle control data; and
wherein controlling one or both of a position and an orientation comprises controlling a yaw, a pitch, or a roll of the drivable land vehicle in response to the land vehicle control data.

Example 86

The control method of example 77 or any one of examples 78-85,
  wherein the coupling assembly comprises a linkage disposed in the housing and coupled to the pair of triggers, and
  wherein generating sensor signals comprises sensing one or both of a position and an orientation of the linkage.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A handheld controller device comprising:
  a housing configured to be held in the hands of a user;
  a trigger assembly comprising:
    a pair of triggers extending outward from a side of the handheld controller device and configured to move along respective trigger paths, each trigger comprising a trigger slide and a trigger pad, the trigger pad disposed outside of the housing and adjacent the side;
    a guide assembly disposed inside the housing and comprising, for each trigger, a channel that extends at least partially along the trigger path of the trigger, the channel configured to seat the trigger slide of the trigger, and
    a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path; and
  circuitry disposed in the housing and comprising:
    one or more sensors configured to generate sensor signals based on positions of the pair of triggers along their respective trigger paths,
    a microcontroller configured to receive the sensor signals and, in response, generate control data, and
    a communication interface configured to communicate the control data from the handheld controller device.

2. The handheld controller device of claim 1,
wherein the housing comprises a wall that defines the side and has first and second openings therethrough;
wherein the pair of triggers comprises:
  a first trigger having a first trigger slide and a first trigger pad, the first trigger slide extending from the first trigger pad into the first opening and terminating in a first trigger end, and
  a second trigger having a second trigger slide and a second trigger pad, the second trigger slide extending from the second trigger pad into the second opening and terminating in a second trigger end; and
wherein the coupling assembly comprises:
  a linkage disposed in the housing and extending between first and second linkage ends, the first and second linkage ends rotatably coupled to, respectively, the first and second trigger ends, and
  a swivel joint coupling the linkage to the housing and connected to the linkage between the first and second linkage ends.

3. The handheld controller device of claim 2,
wherein the first and second trigger ends comprise, respectively, first and second pins;
wherein the first linkage end comprises a first slot configured to receive the first pin therein, thereby rotatably coupling the first linkage end to the first trigger end;

wherein the second linkage end comprises a second slot configured to receive the second pin therein, thereby rotatably coupling the second linkage end to the second trigger end.

4. The handheld controller device of claim 1,
wherein the pair of triggers comprises:
a first trigger having a first trigger path and a first default position thereon, and
a second trigger having a second trigger path and a second default position thereon; and
wherein the guide assembly comprises:
first and second channels configured to seat the trigger slides of, respectively, the first and second triggers,
a first spring disposed adjacent the first channel and aligned along the first trigger path, and
a second spring disposed adjacent the second channel and aligned along the second trigger path,
wherein the first and second springs are configured to bias the first and second triggers towards the first and second default positions, respectively.

5. The handheld controller device of claim 4, wherein the first and second default positions are midway along the first and second trigger paths, respectively.

6. The handheld controller device of claim 4,
wherein the first trigger comprises a first trigger slide having a first pocket therein, the first pocket configured to contain the first spring as the first trigger moves along the first trigger path; and
wherein the second trigger comprises a second trigger slide having a second pocket therein, the second pocket configured to contain the second spring as the second trigger moves along the second trigger path.

7. The handheld controller device of claim 4, wherein the first and second springs are configured to be in compression when the first and second triggers are in, respectively, the first and second default positions.

8. The handheld controller device of claim 1,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly; and
wherein the microcontroller is further configured to receive the second sensor signals and, in response, generate second control data.

9. A system, comprising:
a handheld controller device comprising:
a housing configured to be held in the hands of a user,
a trigger assembly comprising:
a pair of triggers extending outward from a side of the handheld controller device, the pair of triggers being configured to move along respective trigger paths,
a guide assembly disposed inside the housing and comprising, for each trigger, a channel that extends at least partially along the trigger path of the trigger, the channel configured to seat a trigger slide of the trigger, and
a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path, and
circuitry disposed in the housing and comprising:
one or more sensors configured to generate sensor signals based on positions of the pair of triggers along their respective trigger paths, and
a microcontroller configured to receive the sensor signals and, in response, generate control data for a device; and
one or more computer processors configured to perform operations comprising:
receiving the control data from the handheld controller device, and
controlling the device based on the control data.

10. The system of claim 9, wherein the system is a simulator system and the device is a simulated device.

11. The system of claim 10, comprising:
a console comprising the one or more computer processors; and
one or more communication channels between the handheld controller device and the console.

12. The system of claim 11, wherein the one or more communication channels comprise a wired communication link between the handheld controller device and the console.

13. The system of claim 11, wherein the one or more communication channels comprise a wireless communication link between the handheld controller device and the console.

14. The system of claim 9,
wherein the device is an aircraft, and the control data is aircraft control data; and
wherein controlling the device comprises altering, in response to the aircraft control data, a position or an orientation of a motion control surface of the aircraft.

15. The system of claim 14, wherein altering a position or an orientation of a motion control surface comprises controlling a yaw, a pitch, or a roll of the aircraft.

16. The system of claim 9,
wherein the device is a watercraft, and the control data is watercraft control data; and
wherein controlling the device comprises altering, in response to the watercraft control data, a position or an orientation of a motion control surface of the watercraft.

17. The system of claim 9,
wherein the device is a land vehicle, and the control data is land vehicle control data; and
wherein controlling the device comprises altering, in response to the land vehicle control data, one or both of:
a position of a wheel or a track of the land vehicle, and
a rotational direction of the wheel or the track of the land vehicle.

18. The system of claim 9,
wherein the housing comprises a wall having a hole therethrough;
wherein the handheld controller device comprises a slider assembly having a shaft disposed through the hole and configured to move along a slider path;
wherein the circuitry comprises a second sensor configured to generate second sensor signals based on a position of the slider assembly;
wherein the microcontroller is further configured to receive the second sensor signals and, in response, generate second control data for the device; and wherein the operations comprise:
  receiving the second control data from the handheld controller device, and
  controlling an operation characteristic of the device based on the second control data.

19. The system of claim 18,
wherein the device is an aircraft, the control data is aircraft control data, and the second control data is second aircraft control data;
wherein controlling the device comprises altering, in response to the aircraft control data, a position or an orientation of a motion control surface of the aircraft; and
wherein controlling an operation characteristic of the device comprises altering, in response to the second aircraft control data, a flight control parameter of the aircraft, the flight control parameter representing the operational characteristic of the aircraft.

20. The system of claim 19, wherein flight control parameter controls:
a throttle for an engine of the aircraft;
an air-to-fuel mixture for an engine of the aircraft; or
an angle of attack for propeller blades of the aircraft, the angle of attack influencing a rotational speed of the propeller blades.

21. A control method, comprising:
generating sensor signals based on positions of a pair of triggers on a handheld controller device, the handheld controller device comprising:
  a housing configured to be held in the hands of a user, and
  a trigger assembly comprising:
    the pair of triggers, extending outward from a side of the handheld controller device and configured to move along respective trigger paths,
    a guide assembly disposed inside the housing and comprising, for each trigger, a channel that extends at least partially along the trigger path of the trigger, the channel configured to seat a trigger slide of the trigger, and
    a coupling assembly disposed inside the housing and connected to the pair of triggers, the coupling assembly configured to transfer motion between the pair of triggers such that, when either of the triggers moves towards the housing along its trigger path, the coupling assembly moves the other trigger away from the housing along its respective trigger path;
generating control data in response to the sensor signals; and
communicating the control data from the handheld controller device.

22. The control method of claim 21,
wherein communicating the control data comprises communicating the control data to a component of a simulator system; and
wherein the method comprises:
  by operation of one or more computer processors of the simulator system, controlling one or both of a position and an orientation of a simulated device in response to the control data.

23. The control method of claim 22,
wherein the simulated device is a simulated aircraft, and the control data is aircraft control data; and
wherein controlling one or both of a position and an orientation comprises controlling a yaw, a pitch, or a roll in a motion simulation of the simulated aircraft in response to the aircraft control data.

24. The control method of claim 22,
wherein the simulated device is a simulated watercraft, and the control data is watercraft control data; and
wherein controlling one or both of a position and an orientation comprises controlling a yaw, a pitch, or a roll in a motion simulation of the simulated watercraft in response to the watercraft control data.

25. The control method of claim 22,
wherein the simulated device is a simulated land vehicle, and the control data is land vehicle control data; and
wherein controlling one or both of a position and an orientation comprises controlling a yaw, a pitch, or a roll in a motion simulation of the simulated land vehicle in response to the land vehicle control data.

26. The control method of claim 21,
wherein communicating the control data comprises communicating the control data to a physical device; and
wherein the method comprises:
  by operation of one or more computer processors in a control system of the physical device, controlling one or both of a position and an orientation of the physical device in response to the control data.

27. The control method of claim 26,
wherein the physical device is a flyable aircraft, and the control data is aircraft control data; and
wherein controlling one or both of a position and an orientation comprises controlling a yaw, a pitch, or a roll of the flyable aircraft in response to the aircraft control data.

28. The control method of claim 26,
wherein the physical device is a sailable watercraft, and the control data is watercraft control data; and
wherein controlling one or both of a position and an orientation comprises controlling a yaw, a pitch, or a roll of the sailable watercraft in response to the watercraft control data.

29. The control method of claim 26,
wherein the physical device is a drivable land vehicle, and the control data is land vehicle control data; and
wherein controlling one or both of a position and an orientation comprises controlling a yaw, a pitch, or a roll of the drivable land vehicle in response to the land vehicle control data.

30. The control method of claim 21,
wherein the coupling assembly comprises a linkage disposed in the housing and coupled to the pair of triggers; and
wherein generating sensor signals comprises sensing one or both of a position and an orientation of the linkage.

* * * * *